(12) United States Patent
Tabuchi

(10) Patent No.: US 6,529,647 B2
(45) Date of Patent: Mar. 4, 2003

(54) OPTICAL DEVICE WITH OPTICAL WAVEGUIDES AND MANUFACTURING METHOD THEREFOR

(75) Inventor: Haruhiko Tabuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 7 days.

(21) Appl. No.: 09/740,234

(22) Filed: Dec. 18, 2000

(65) Prior Publication Data

US 2001/0024537 A1 Sep. 27, 2001

(30) Foreign Application Priority Data

Mar. 14, 2000 (JP) ........................................ 2000-070239

(51) Int. Cl.[7] .............................................. G02F 1/035
(52) U.S. Cl. ......................................................... 385/3
(58) Field of Search ........................... 385/17, 3, 9, 11, 385/14, 16

(56) References Cited

U.S. PATENT DOCUMENTS

| | | | |
|---|---|---|---|
| 5,168,534 A | * 12/1992 | McBrien et al. | 385/3 |
| 5,323,406 A | * 6/1994 | Yee et al. | 372/26 |
| 5,572,611 A | * 11/1996 | Jinguji et al. | 385/17 |
| 5,956,437 A | 9/1999 | Day et al. | |
| 6,292,599 B1 | * 9/2001 | Augustsson | 385/16 |

FOREIGN PATENT DOCUMENTS

JP 07281215 10/1995

* cited by examiner

*Primary Examiner*—Javaid Nasri
(74) *Attorney, Agent, or Firm*—Katten Muchin Zavis Rosenman

(57) ABSTRACT

An optical device including first and second Mach-Zehnder type optical interference units cascaded with each other. The first Mach-Zehnder type optical interference unit includes a pair of interference optical waveguide arms having different lengths adjusted so that the phase difference of propagated light becomes π. A first heater is mounted on the longer optical waveguide arm of the first interference unit. The second Mach-Zehnder type optical interference unit includes a pair of interference optical waveguide arms having equal lengths. A second heater is mounted on one of the optical waveguide arms of the second interference unit. The first and second heaters are controlled so that initial electric energy is preliminarily applied to the second heater, and when increasing electric energy to be applied to the first heater, electric energy to be applied to the second heater is simultaneously decreased, whereas when decreasing the electric energy to be applied to the first heater, the electric energy to be applied to the second heater is simultaneously increased.

11 Claims, 25 Drawing Sheets

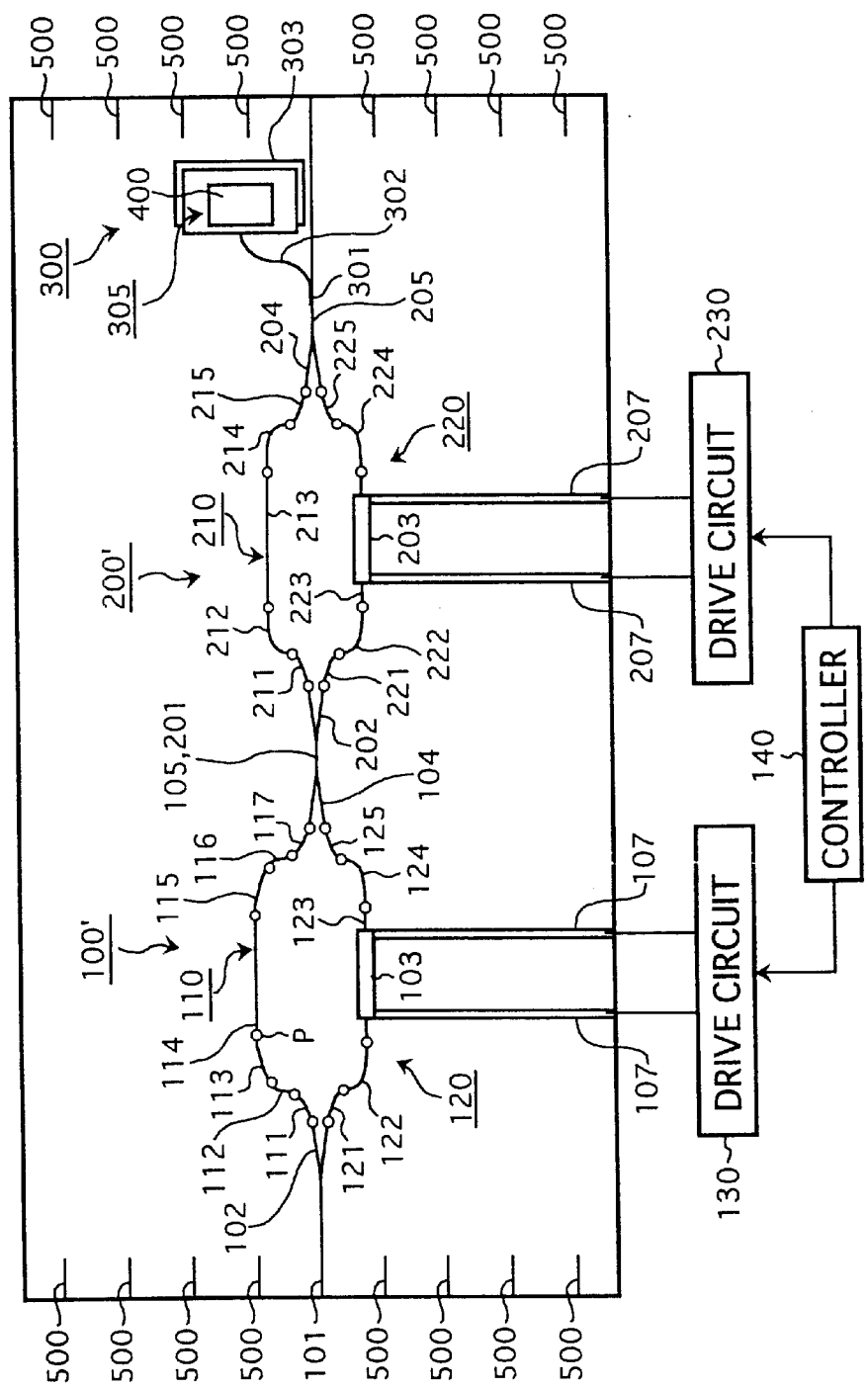

OPTICAL DEVICE WITH OPTICAL WAVEGUIDES AND MANUFACTURING METHOD THEREFOR

BACKGROUND OF THE INVENTION

1. Field of the Invention

The present invention relates generally to an optical device with optical waveguides having a variable optical attenuation function, and more particularly to an optical device with optical waveguides capable of electrically controlling the attenuation of light passing through an optical waveguide circuit.

2. Description of the Related Art

U.S. Pat. No. 5,956,437 (Japanese Patent Laid-open No. Hei 11-249089) discloses an electrically controllable optical attenuator including a first Mach-Zehnder type optical interference unit and a second Mach-Zehnder type optical interference unit cascaded with each other. The first Mach-Zehnder type optical interference unit includes a pair of optical waveguide arms having different lengths. That is, one of the optical waveguide arms in the first Mach-Zehnder type optical interference unit is longer than the other. Similarly, the second Mach-Zehnder type optical interference unit includes a pair of optical waveguide arms having different lengths. That is, one of the optical waveguide arms in the second Mach-Zehnder type optical interference unit is longer than the other. The longer optical waveguide arm in the first Mach-Zehnder type optical interference unit is provided with phase control means, and the shorter optical waveguide arm in the second Mach-Zehnder type optical interference unit is provided with phase control means. In each optical interference unit, the builtin phase or initial phase of light passing through the longer optical waveguide arm is delayed by $\pi$ or $2\pi$ from the phase of light passing through the shorter optical waveguide arm.

In the case that the initial phase delay is set to $\pi$, a maximum attenuation, or maximum loss is obtained when the phase delay by the phase control means is 0, whereas a minimum attenuation, or minimum loss is obtained when the phase delay by the phase control means is $\pi$. In the case that the initial phase delay is set to $2\pi$, a minimum attenuation, or minimum loss is obtained when the phase delay by the phase control means is 0, whereas a maximum attenuation, or maximum loss is obtained when the phase delay by the phase control means is $\pi$.

Silica is used for each optical waveguide arm, and an electric heater is used for each phase control means. When power to be injected into the electric heater is increased, the temperature of the optical waveguide arm on which the electric heater is mounted rises to cause an increase in refractive index. As a result, the phase delay of light passing through the optical waveguide arm on which the electric heater is mounted increases, so that when the initial phase delay is set to $\pi$, the attenuation is decreased, whereas when the initial phase delay is set to $2\pi$, the attenuation is increased. In the conventional electrically controllable optical attenuator described in the above publication, the attenuation characteristics of the first and second Mach-Zehnder type optical interference units are added together to realize an optical attenuator superior in wavelength flatness.

In the case of using a heater as each phase control means, the phase changes by $\pi$ when a maximum power of about 500 mW is injected into each heater (a total maximum power of about 1 W for the two heaters), and the attenuation can be controlled from a minimum value to a maximum value. In the conventional optical attenuator described in U.S. Pat. No. 5,956,437 mentioned above, substantially the same quantity of energy is injected into each heater to control the attenuation, so that a change in injected power according to the attenuation becomes large. As a result, a change in heat value in the whole of the optical device becomes large. Such a large change in heat value causes a problem that the temperature of the optical attenuator and its peripheral device easily change. Thus, the optical attenuator described in the above publication has the problem that the temperature easily changes with a change in attenuation.

Further, in wavelength division multiplex (WDM) communication, a variable optical attenuator is used as an equalizer for equalizing the powers of a plurality of light sources. In this case, the variable optical attenuator is arranged downstream of each light source, and the powers of the light sources are equalized by setting the attenuation to the light source having the lowest optical power to 0 and attenuating the powers of the other light sources. In the case that the variable optical attenuator is used as such an equalizer for WDM communication, it is operated in a wavelength region where the loss is relatively low. In the conventional electrically controllable optical attenuator described in the above publication, the loss is minimum when the power input into each heater is maximum. Accordingly, in the case of using this conventional optical attenuator as an equalizer for WDM communication, it is operated in a wavelength region where the power consumption becomes substantially maximum. For example, in the case of using this conventional optical attenuator as an equalizer for WDM communication having 32 channels, the maximum power consumption becomes about 32 W.

SUMMARY OF THE INVENTION

It is therefore an object of the present invention to provide an optical device with optical waveguides which can electrically control an attenuation with a reduction in power consumption.

It is another object of the present invention to provide an optical device with optical waveguides which can electrically control an attenuation with a reduction in change in heat value according to the attenuation.

It is a further object of the present invention to provide a manufacturing method for an optical device with optical waveguides.

In accordance with an aspect of the present invention, there is provided an optical device comprising a first Mach-Zehnder type optical interference unit including a first input optical waveguide, a first input 3-dB optical coupler optically connected in tandem with said first input optical waveguide, first and second interference optical waveguide arms optically connected in tandem with said first input 3-dB optical coupler opposite to said first input optical waveguide, said second optical waveguide arm having a length shorter than that of said first optical waveguide arm, a first output 3-dB optical coupler optically connected in tandem with said first and second interference optical waveguide arms, and a first output optical waveguide optically connected in tandem with said first output 3-dB optical coupler opposite to said first and second interference optical waveguide arms; a second Mach-Zehnder type optical interference unit including a second input optical waveguide, a second input 3-dB optical coupler optically connected in tandem with said second input optical waveguide, third and fourth interference optical waveguide arms optically connected in tandem with said second input 3-dB optical coupler opposite to said second input optical waveguide, a second output 3-dB optical coupler optically connected in tandem with said third and fourth interference optical waveguide arms, and a second output optical waveguide optically connected in tandem with said second output 3-dB optical coupler opposite to said third and fourth interference optical waveguide arms; first phase control means provided on said first interference optical waveguide arm; and second phase control means provided on any one of said third and fourth interference optical waveguide arms; the lengths of said third and fourth interference optical waveguide arms being adjusted so that the phase difference of light having a given wavelength passing through said third and fourth interference optical waveguide arms becomes $2n\pi$ where n is an integer greater than or equal to 0; said first and second Mach-Zehnder type optical interference units being optically connected in tandem with each other.

The lengths of said first and second interference optical waveguide arms are adjusted so that the phase difference of light having a given wavelength passing through said first and second interference optical waveguide arms becomes $(2n+1+\alpha)\pi$ where n is an integer greater than or equal to 0 and $\alpha$ is a number greater than or equal to 0 and less than 1. Preferably, said first phase control means comprises a first heating element, and said second phase control means comprises a second heating element.

Preferably, the optical device further comprises a first drive circuit for driving the first heating element, a second drive circuit for driving the second heating element, and a controller for controlling the first and second drive circuits. The controller drives the second drive circuit to control it so that predetermined initial electric energy is preliminarily applied to the second heating element. The controller further controls the first and second drive circuits so that when increasing electric energy to be applied to the first heating element, electric energy to be applied to the second heating element is simultaneously decreased, whereas when decreasing the electric energy to be applied to the first heating element, the electric energy to be applied to the second heating element is simultaneously increased.

Preferably, the controller controls the first and second drive circuits so that an increase in the electric energy to be applied to the first heating element becomes equal to a decrease in the electric energy to be applied to the second heating element when decreasing the electric energy from the second heating element simultaneously with increasing the electric energy to the first heating element. Alternatively, the controller controls the first and second drive circuits so that an increase in the electric energy to be applied to the first heating element becomes larger than a decrease in the electric energy to be applied to the second heating element when decreasing the electric energy from the second heating element simultaneously with increasing the electric energy to the first heating element.

According to the present invention, the wavelength flatness can be improved, and the sum of powers to be supplied to the two heating elements can be reduced as compared with the prior art. Furthermore, a change in the sum of powers to be supplied to the two heating elements can also be reduced as compared with the prior art, thereby reducing a change in heat value in the whole of the optical device having a variable optical attenuation function. In the case of using the optical device according to the present invention as an equalizer for WDM communication, the optical device is generally operated in a wavelength region where the power consumption becomes minimum, thereby effecting a reduction in power consumption.

In accordance with another aspect of the present invention, there is provided an optical device comprising a first Mach-Zehnder type optical interference unit including a first input optical waveguide, a first input 3-dB optical coupler optically connected in tandem with said first input optical waveguide, first and second interference optical waveguide arms optically connected in tandem with said first input 3-dB optical coupler opposite to said first input optical waveguide, said second optical waveguide arm having a length shorter than that of said first optical waveguide arm, a first output 3-dB optical coupler optically connected in tandem with said first and second interference optical waveguide arms, and a first output optical waveguide optically connected in tandem with said first output 3-dB optical coupler opposite to said first and second interference optical waveguide arms; a second Mach-Zehnder type optical interference unit including a second input optical waveguide, a second input 3-dB optical coupler optically connected in tandem with said second input optical waveguide, third and fourth interference optical waveguide arms optically connected in tandem with said second input 3-dB optical coupler opposite to said second input optical waveguide, a second output 3-dB optical coupler optically connected in tandem with said third and fourth interference optical waveguide arms, and a second output optical waveguide optically connected in tandem with said second output 3-dB optical coupler opposite to said third and fourth interference optical waveguide arms; first phase control means provided on said second interference optical waveguide arm; and second phase control means provided on any one of said third and fourth interference optical waveguide arms; the lengths of said first and second interference optical waveguide arms being adjusted so that the phase difference of light having a given wavelength passing through said first and second interference optical waveguide arms becomes $2m\pi$ where m is an integer greater than 0; the lengths of said third and fourth interference optical waveguide arms being adjusted so that the phase difference of light having a given wavelength passing through said third and fourth interference optical waveguide arms becomes $2n\pi$ where n is an integer greater than or equal to 0; said first and second Mach-Zehnder type optical interference units being optically connected in tandem with each other.

In accordance with a further aspect of the present invention, there is provided a manufacturing method for an optical device with optical waveguides, comprising the steps of uniformly forming an under-cladding layer on a substrate; uniformly forming a core layer on said under-cladding layer; etching said core layer to form a core and a core base wider than said core and continuous to said core; uniformly forming an over-cladding layer on said under-cladding layer so as to cover said core and said core base; removing said over-cladding layer on said core base, a part of said core, and a part of said core base and said under-cladding layer by etching to form an optical component mounting surface and expose an end surface of said core; and mounting an optical component on said optical component mounting surface so that said optical component is optically coupled to said end surface of said core.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 25 is a plan view of a second preferred embodiment of the present invention;

DETAILED DESCRIPTION OF THE PREFERRED EMBODIMENTS

Figure 1:
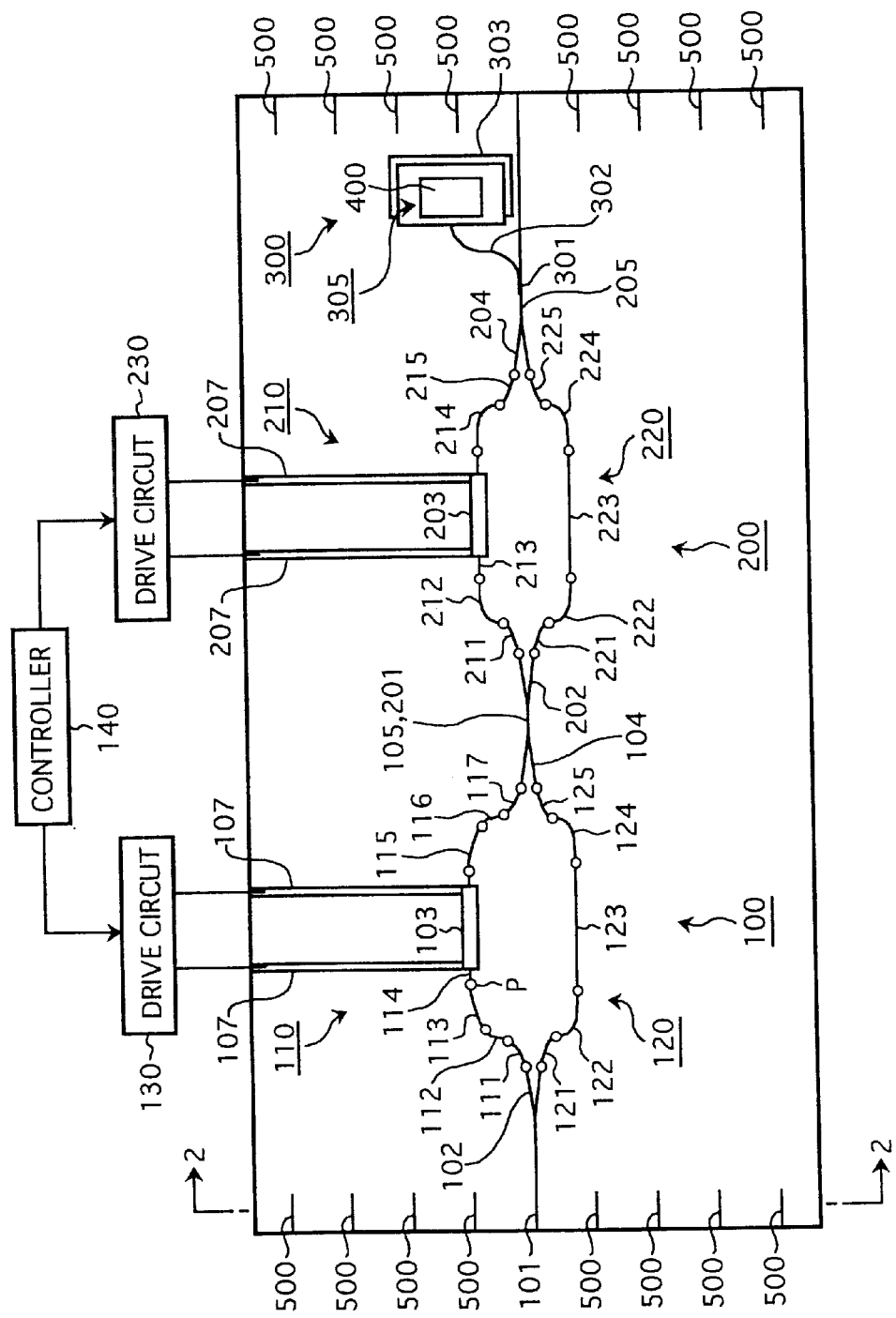
FIG. 1 is a plan view of a first preferred embodiment of the present invention.

Referring to FIG. 1, there is shown a plan view of an optical device with optical waveguides according to a first preferred embodiment of the present invention. The optical device with optical waveguides according to the first preferred embodiment is configured by cascading a first Mach-Zehnder type optical interference unit 100 and a second Mach-Zehnder type optical interference unit 200. The first Mach-Zehnder type optical interference unit 100 includes a first input optical waveguide 101, a first input 3-dB optical branch or coupler 102, first and second interference optical waveguide arms 110 and 120, a first output 3-dB optical coupler 104, and a first output optical waveguide 105. The first input 3-dB optical coupler 102 is optically connected to the first input optical waveguide 101. The first and second interference optical waveguide arms 110 and 120 are optically connected at their first ends to the first input 3-dB optical coupler 102 opposite to the first input optical waveguide 101.

The other ends of the first and second interference optical waveguide arms 110 and 120 are optically connected to the first output 3-dB optical coupler 104. The first output optical waveguide 105 is optically connected to the first output 3-dB optical coupler 104 opposite to the first and second interference optical waveguide arms 110 and 120. The first interference optical waveguide arm 110 is longer than the second interference optical waveguide arm 120. Usually, the lengths of the first and second interference optical waveguide arms 110 and 120 are set so that a phase shift of π is provided at an operating wavelength, or the lengths of the first and second interference optical waveguide arms 110 and 120 are adjusted so that the phase difference of light having a given wavelength passing through the first and second interference optical waveguide arms 110 and 120 becomes $(2n+1+\alpha)\pi$ where n is an integer greater than or equal to 0 and α is a number greater than or equal to 0 and less than 1.

On the other hand, the second Mach-Zehnder type optical interference unit 200 includes a second input optical waveguide 201, a second input 3-dB optical coupler 202, third and fourth interference optical waveguide arms 210 and 220, a second output 3-dB optical coupler 204, and a second output optical waveguide 205. The first output optical waveguide 105 is optically connected to the second input optical waveguide 201. The first output optical waveguide 105 and the second input optical waveguide 201 may be identical with each other. The second input optical waveguide 201 is optically connected to the second input 3-dB optical coupler 202. The third and fourth interference optical waveguide arms 210 and 220 are optically connected at their first ends to the second input 3-dB optical coupler 202 opposite to the second input optical waveguide 201.

The other ends of the third and fourth interference optical waveguide arms 210 and 220 are optically connected to the second output 3-dB optical coupler 204. The second output optical waveguide 205 is optically connected to the second output 3-dB optical coupler 204 opposite to the third and fourth interference optical waveguide arms 210 and 220. Generally, the lengths of the third and fourth interference optical waveguide arms 210 and 220 are set equal to each other, or the lengths of the third and fourth interference optical waveguide arms 210 and 220 are adjusted so that the phase difference of light having a given wavelength passing through the third and fourth interference optical waveguide arms 210 and 220 becomes 2nπ where n is an integer greater than or equal to 0.

A first heater 103 as the first phase control means is provided on the first interference optical waveguide arm 110. The first heater 103 is connected through wiring patterns 107 to a drive circuit 130. Similarly, a second heater 203 as the second phase control means is provided on the third interference optical waveguide arm 210. The second heater 203 is connected through wiring patterns 207 to a drive circuit 230.

The drive circuits 130 and 230 are controlled by a controller 140. The controller 140 is configured by a microprocessor unit (MPU), for example. Since the third and fourth interference optical waveguide arms 210 and 220 in the second Mach-Zehnder type optical interference unit 200 have the same length, the second heater 203 may be mounted on the fourth interference optical waveguide arm 220.

An optical coupler (optical branch) 301 for monitoring is optically connected to the second output optical waveguide 205. Reference numeral 302 denotes an optical waveguide for introducing monitor light obtained by the optical coupler 301. Reference numeral 300 denotes a photodiode mounting portion having a core base 303. The core base 303 defines a photodiode mounting surface 305, and a photodiode 400 is mounted on the photodiode mounting surface 305.

Figure 2:
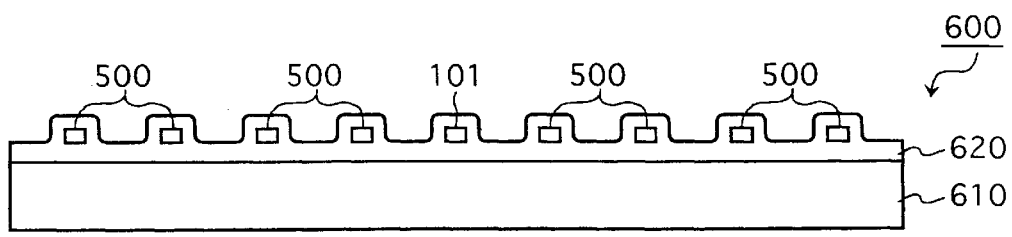
FIG. 2 is a cross section taken along the line 2—2 in FIG. 1.

Referring to FIG. 2 which is a cross section taken along the line 2—2 in FIG. 1, there is shown an optical waveguide 600. The optical waveguide 600 includes a substrate 610, a cladding 620, the input optical waveguide (core) 101 embedded in the cladding 620, and a plurality of height adjusting layers 500 embedded in the cladding 620. The substrate 610 is formed of silicon, and the cores (101 and 500) and the cladding 620 are formed from silica layers by CVD on the silicon substrate 610. For example, the effective refractive index of the optical waveguide formed by the core 101 and the cladding 620 is 1.46. Each of the first and second heaters 103 and 203 is formed from a chromium thin film having a width of 40 μm and a thickness of 0.3 μm to 0.5 μm. Each of the wiring patterns 107 and 207 is formed from a gold thin film.

Figure 3:
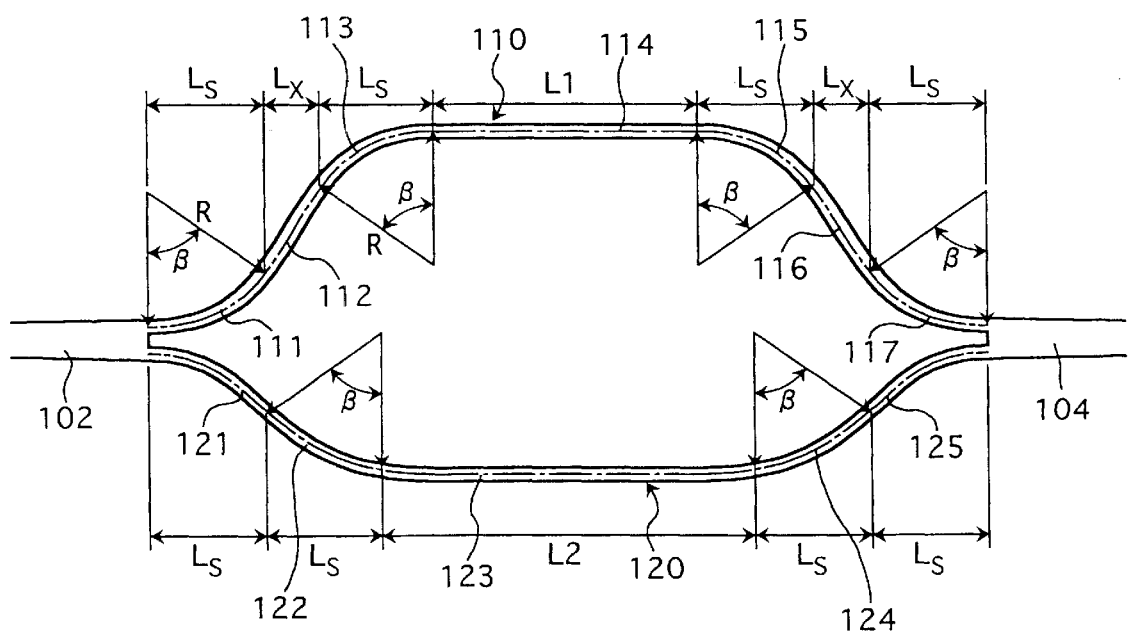
FIG. 3 is an enlarged plan view of interference optical waveguide arms, showing the details thereof.

Referring to FIG. 3, there is shown a configuration of arm elements constituting the first and second interference optical waveguide arms 110 and 120 for connecting the first and second couplers 102 and 104. The first interference optical waveguide arm 110 includes a plurality of arm elements 111, 112, 113, 114, 115, 116, and 117. Each of the arm elements 111, 113, 115, and 117 is configured by an arc having a radius of curvature R and a central angle β. Specific values for R and β are R=20 mm and β=0.0826 radian. The arm element 112 is a straight element connecting the arm elements 111 and 113, and the arm element 116 is also a straight element connecting the arm elements 115 and 117. Each of the arm elements 112 and 116 has a horizontal length (a length projected onto the horizontal axis) Lx. For example, Lx is set to 78 μm.

In this case, the optical path length of the first interference optical waveguide arm 110 is longer by about 0.78 μm than that of the second interference optical waveguide arm 120. The straight arm element 112 is set in position so that it becomes a tangent to both the arcuate arm elements 111 and 113. Similarly, the straight arm element 116 is set in position so that it becomes a tangent to both the arcuate arm elements 115 and 117. The arm element 114 is a straight arm element connecting the arcuate arm elements 113 and 115.

On the other hand, the second interference optical waveguide arm 120 includes a plurality of arm elements 121, 122, 123, 124, and 125. Each of the arm elements 121, 122, 124, and 125 is configured by an arc having a radius of curvature R and a central angle β. The arcuate arm elements 121 and 122 are connected together, and the arcuate arm elements 124 and 125 are connected together. The arm element 123 is a straight element connecting the arcuate arm elements 122 and 124. Thus, the second interference optical waveguide arm 120 has such a structure that the straight arm elements 112 and 116 of the first interference optical waveguide arm 110 are omitted. An increase ΔL in length by the straight arm elements 112 and 116 becomes 2×n×Lx×{(1/cos β)−1} where n is the refractive index of each of the interference optical waveguide arms 110 and 120. For example, assuming that n=1.46 and β=0.0826 radian, ΔL becomes equal to about 1/100 of Lx. Accordingly, only by setting Lx with a pitch of 1 μm, the optical path difference can be set with an accuracy of 0.01 μm. By decreasing the angle β, the optical path difference can be set to a smaller value. Conversely, by increasing the angle β, the optical path difference can be set to a larger value. Thus, the optical path difference can be easily set to a minute value by forming each of the first and second interference optical waveguide arms 110 and 120 from a plurality of arm elements.

The third and fourth interference optical waveguide arms 210 and 220 of the second Mach-Zehnder type optical interference unit 200 have the same configuration. The third interference optical waveguide arm 210 includes a straight arm element 213 and arcuate arm elements 211, 212, 214, and 215 each having a radius of curvature R and a central angle β. Similarly, the fourth interference optical waveguide arm 220 includes a straight arm element 223 and arcuate arm elements 221, 222, 224, and 225 each having a radius of curvature R and a central angle β.

As mentioned above, the arm elements 123, 213, and 223 are straight, and the length of each of the arm elements 123, 213, and 223 is 4.6 mm in the case that the length of each of the heaters 103 and 203 is 4 mm, for example. The arm element 114 is also straight, and its length is equal to a value obtained by subtracting a value twice Lx from the length of the arm element 123. For example, the length of the arm element 114 is 4444 μm in the case that Lx is 78 μm. In the first Mach-Zehnder type optical interference unit 100, the length of the interference optical waveguide arm 110 is larger by a phase of π for a given wavelength than the length of the interference optical waveguide arm 120. In the second Mach-Zehnder type optical interference unit 200, the length of the interference optical waveguide arm 210 is equal to the length of the interference optical waveguide arm 220.

The drive circuit 230 is controlled by the controller 140 to preliminarily inject a power P0 into the second heater 203, so as to provide a phase difference π. At this time, the power to be injected into the first heater 103 is 0. In this condition, the attenuation to light having a given wavelength $\lambda_0$ (=1.56 μm) is maximum. In the case of decreasing the attenuation, a power P1 is applied to the first heater 103 and the power to be injected into the second heater 203 is decreased by P1. The phase of light passed through the interference optical waveguide arms 110, 120, 210, and 220 changes according to the injected powers to the heaters 103 and 203, thereby changing the attenuation.

Figure 4:
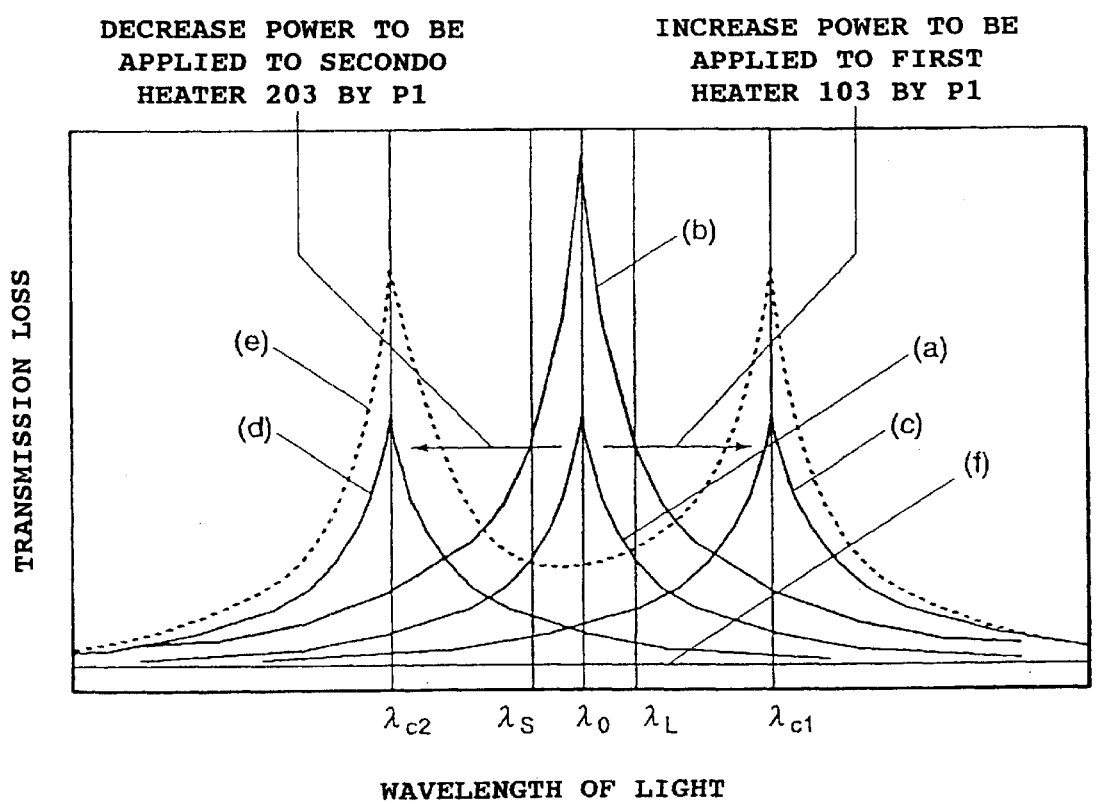
FIG. 4 is a diagram showing an example of the transmission loss spectrum of the first preferred embodiment.

FIG. 4 shows the relation between wavelength and attenuation (transmission loss) in the optical device (optical attenuator) with optical waveguides shown in FIG. 1. The line (a) in FIG. 4 shows a transmission loss a spectrum of the first Mach-Zehnder type interference unit 100 in which the first interference optical waveguide arm 110 is longer by the phase π for the given wavelength $\lambda_0$ than the second interference optical waveguide arm 210, and the line (f) in FIG. 4 shows a transmission loss spectrum of the second Mach-Zehnder type interference unit 200 in which the interference optical waveguide arms 210 and 220 have the same length. The loss shown by the line (f) is equal to the sum of excess losses in the two 3-dB couplers 202 and 204 and propagation losses in the interference optical waveguide arms 210 and 220.

When the power P0 is applied to the second heater 203, the transmission loss spectrum of the second Mach-Zehnder type interference unit 200 becomes the line (a). At this time, the transmission loss spectrum of the optical attenuator as a whole becomes equal to the sum of the transmission loss spectrum of the first Mach-Zehnder type interference unit 100 and the transmission loss spectrum of the second Mach-Zehnder type interference unit 200, and this overall transmission loss spectrum is shown by the line (b). When the power to be applied to the first heater 103 is increased by P1, the transmission loss spectrum of the first Mach-Zehnder type interference unit 100 becomes the line (c), whereas when the power to be applied to the second heater 203 is decreased by P1, the transmission loss spectrum of the second Mach-Zehnder type interference unit 200 becomes the line (d).

At this time, the transmission loss spectrum of the optical attenuator configured by cascading the two Mach-Zehnder type interference units 100 and 200 becomes the sum of the lines (c) and (d), which is shown by the line (e). The line (e) is superior in wavelength flatness to the line (c) or the line (d) at wavelengths near $\lambda_0$. At this time, the sum of the power to be supplied to the first heater 103 and the power to be supplied to the second heater 203 is always equal to P0. As a result, it is possible to realize an optical attenuator in which there is no change in heat value according to attenuation.

Figure 5:
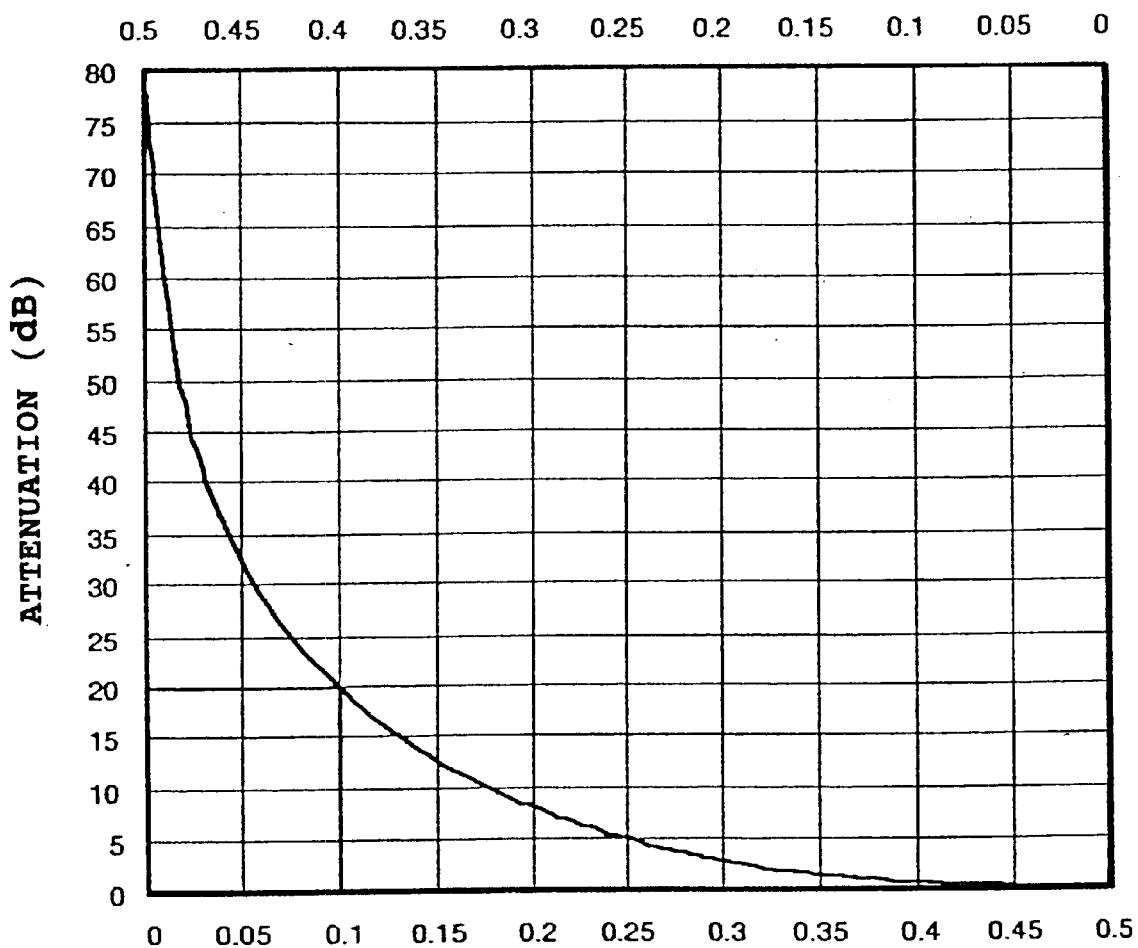
FIG. 5 is a graph showing an example of the distribution of powers to be applied to heaters.

FIG. 5 is a graph showing the attenuation of the optical device (optical attenuator) with optical waveguides to the wavelength $\lambda_0$ (e.g., 1.56 μm) in relation to the power applied to the first heater 103 or the power withdrawn from the second heater 203 (each of the powers being equal to P1). In FIG. 5, the vertical axis represents the attenuation and the horizontal axis represents the power. As apparent from FIG. 5, the attenuation can be controlled according to the power P1. In this preferred embodiment, the power P0 as an initial power (0.5 W) is preliminarily applied to the second heater 203, and in controlling the attenuation, the power P1 is applied to the first heater 103 and the power P1 is withdrawn from the second heater 203 at the same time. Accordingly, the total power consumption is maintained at the constant value P0 (=0.5 W).

Since the total power consumption is constant, the heat value is also constant, thereby effecting easy temperature adjustment. In the conventional optical attenuator described in U.S. Pat. No. 5,956,437, the power consumption is 1 W at the maximum. To the contrary, this preferred embodiment has an advantage that the power consumption can be reduced to 0.5 W. The attenuation characteristic shown in FIG. 5 is not limited to only the case of using the specific wavelength. For example, the wavelengths $\lambda_S$ to $\lambda_L$ shown in FIG. 4 are remarkable, and the optical attenuator according to this preferred embodiment functions as a variable optical attenuator having wavelength flatness in the wavelength range of $\lambda_S$ to $\lambda_L$.

Figure 6:
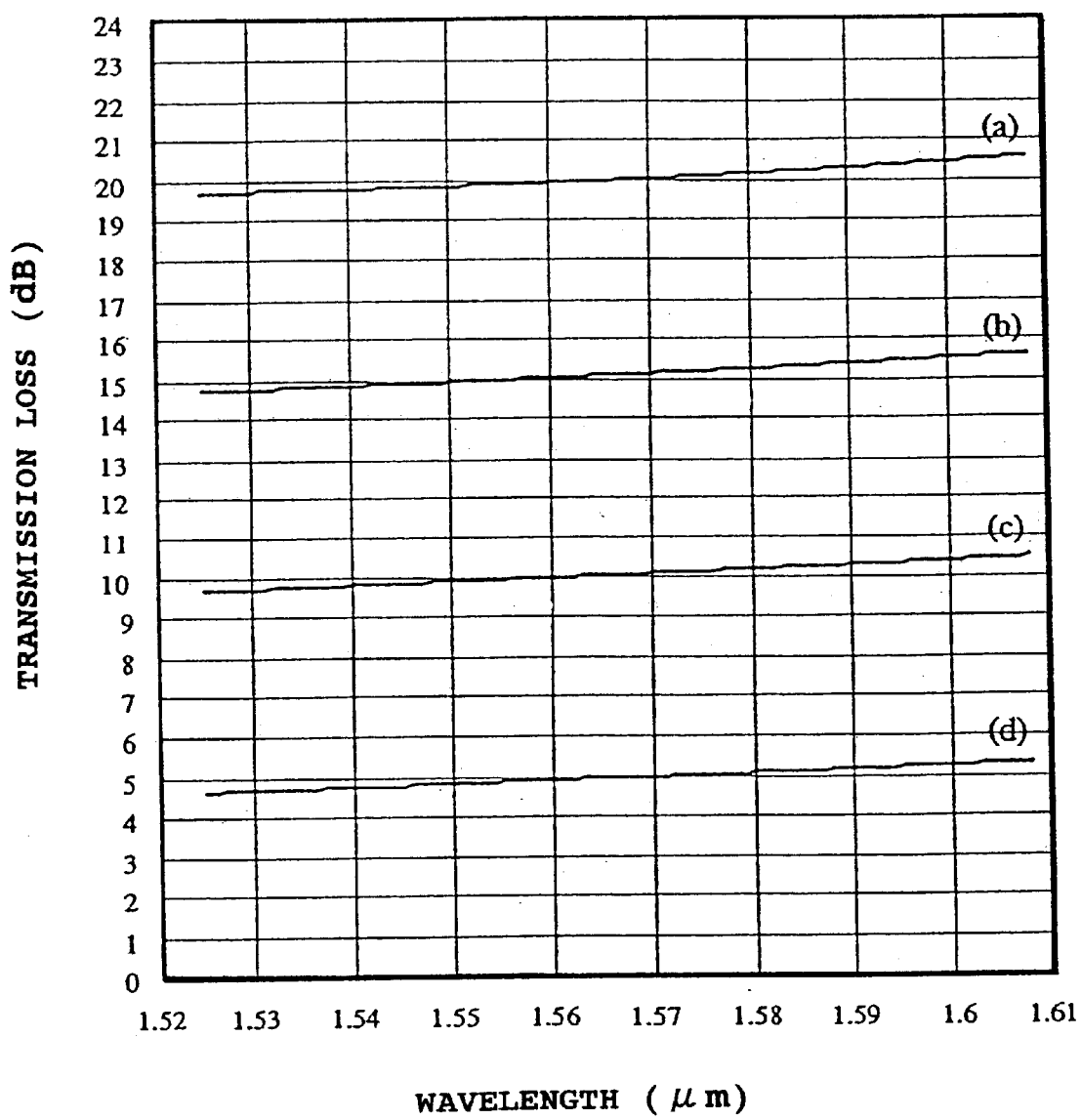
FIG. 6 is a graph showing the transmission loss in the case of changing the powers to be applied to the heaters.

FIG. 6 shows the transmission loss spectrum of the optical attenuator according to this preferred embodiment in the case that $\lambda_S$ is set to 1.525 μm and $\lambda_L$ is set to 1.608 μm. In FIG. 6, the line (a) shows the transmission loss spectrum when the power applied to the first heater 103 is small and the power applied to the second heater 203 is large. The line (d) shows the transmission loss spectrum when the power applied to the first heater 103 is large and the power applied to the second heater 203 is small. The line (b) and the line (c) show the transmission loss spectra when the powers applied to the first and second heaters 103 and 203 are medium.

Figure 7:
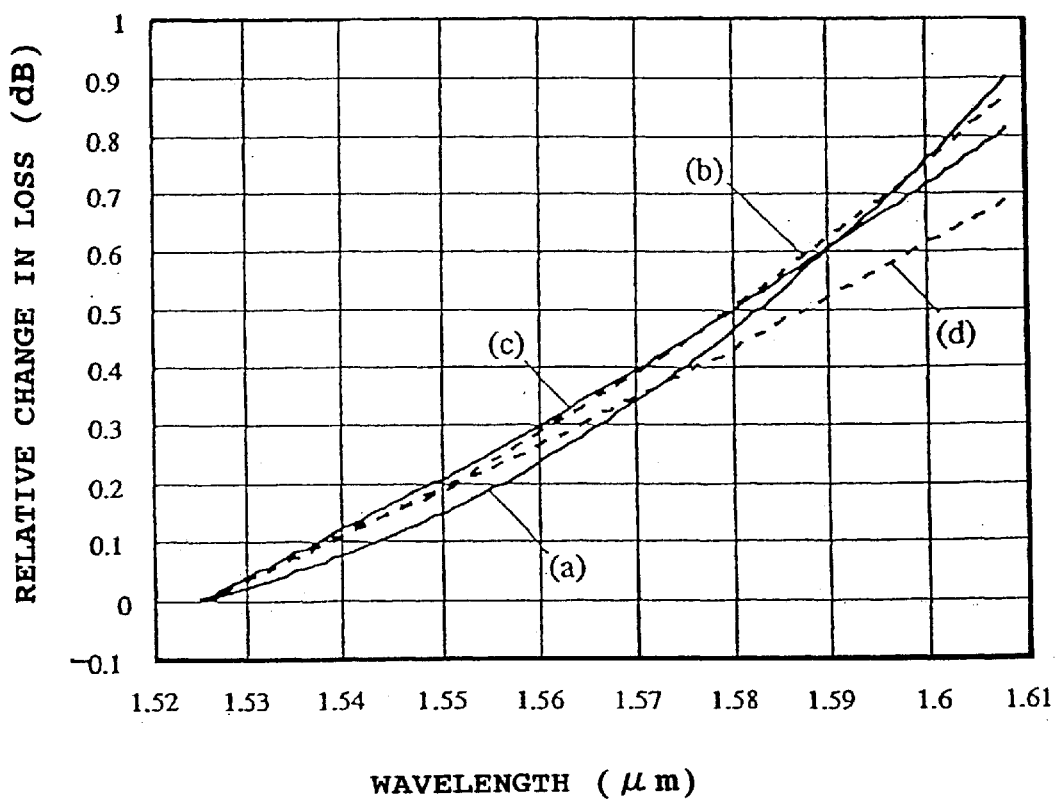
FIG. 7 is a graph showing a relative loss to the loss at a center wavelength (=1.565 μm) as an arithmetic mean.

FIG. 7 is a graph showing a relative loss to the loss at a center wavelength (=1.565 μm) as an arithmetic mean. In FIG. 7, the lines (a) to (d) respectively correspond to the conditions of the lines (a) to (d) shown in FIG. 6. The larger the loss, the larger the wavelength dependence of the relative loss, and the maximum value of the relative loss is about 0.9 dB. In the case that the maximum attenuation required for control is small in FIG. 5, e.g., in the case that the maximum attenuation is set to 20 dB, the difference in length between the first and second interference optical waveguide arms 110 and 120 of the first Mach-Zehnder type interference unit 100 may be increased by an amount corresponding to the case that a power of 0.1 W is applied to the interference unit 100, and the initial power to be applied to the second Mach-Zehnder type interference unit 200 may be reduced a little, e.g., down to 0.4 W.

Increasing the difference in length between the first and second interference optical waveguide arms 110 and 120 of the first Mach-Zehnder type interference unit 100 by a small amount corresponding to the case that a power of 0.1 W is applied to the interference unit 100 may be effected by increasing the length Lx shown in FIG. 3 to 91.2 μm, for example. In this case, the optical path difference between the first and second interference optical waveguide arms 110 and 120 becomes 0.912 μm. According to this preferred embodiment, the difference in length between the first and second interference optical waveguide arms 110 and 120 of the first Mach-Zehnder type interference unit 100 is set so that the phase difference of light having a given wavelength (1.56 μm in this preferred embodiment) becomes $(2n+1+\alpha)\pi$ where n is an integer greater than or equal to 0 and α is a number greater than or equal to 0 and less than 1. In this preferred embodiment, α=0.2.

Figure 8:
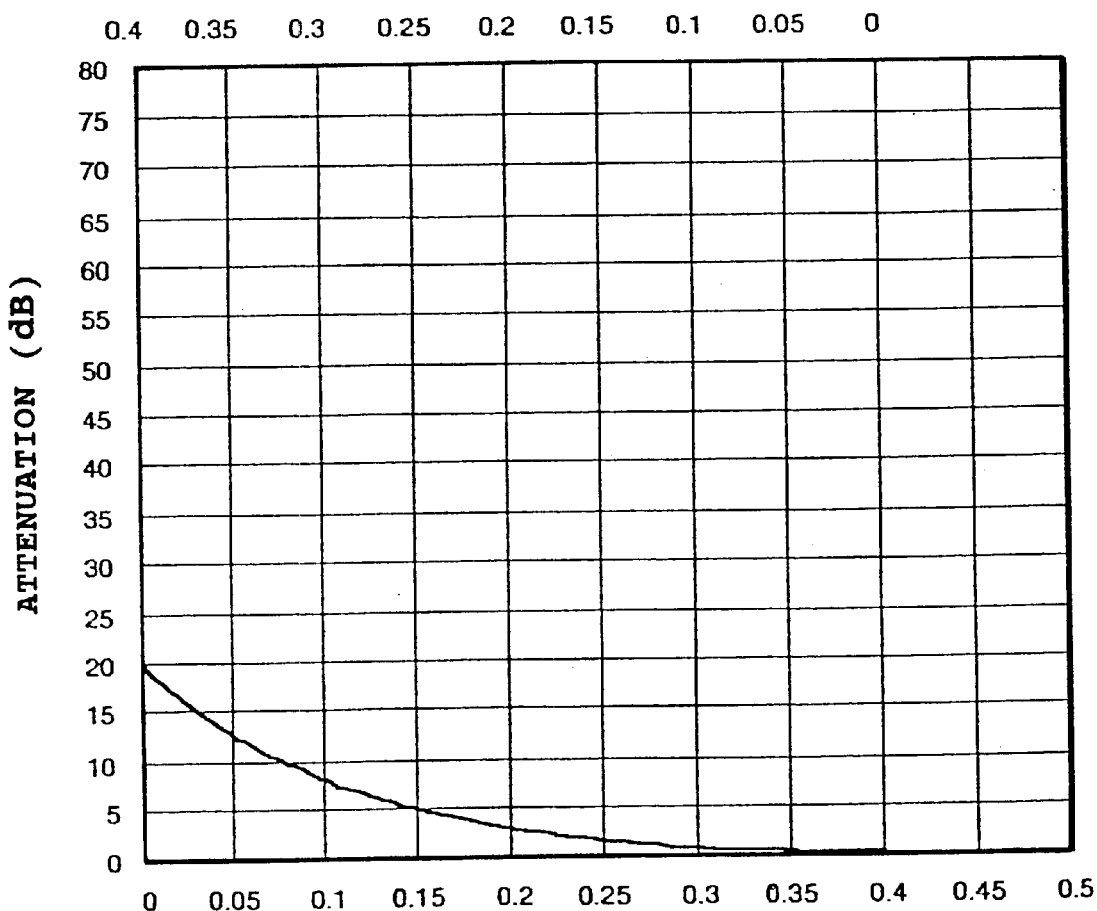
FIG. 8 is a graph showing another example of the distribution of powers to be applied to the heaters.

FIG. 8 shows the relation between the attenuation and the powers applied to the first and second heaters 103 and 203 in the case that the optical path difference between the first and second interference optical waveguide arms 110 and 120 of the first Mach-Zehnder type interference unit 100 is set to 0.912 μm. In this case, the total power consumption of the first and second heaters 103 and 203 is 0.4 W, and it is understood that the power consumption is reduced by 0.1 W as compared with the case shown in FIG. 5.

Figure 9:
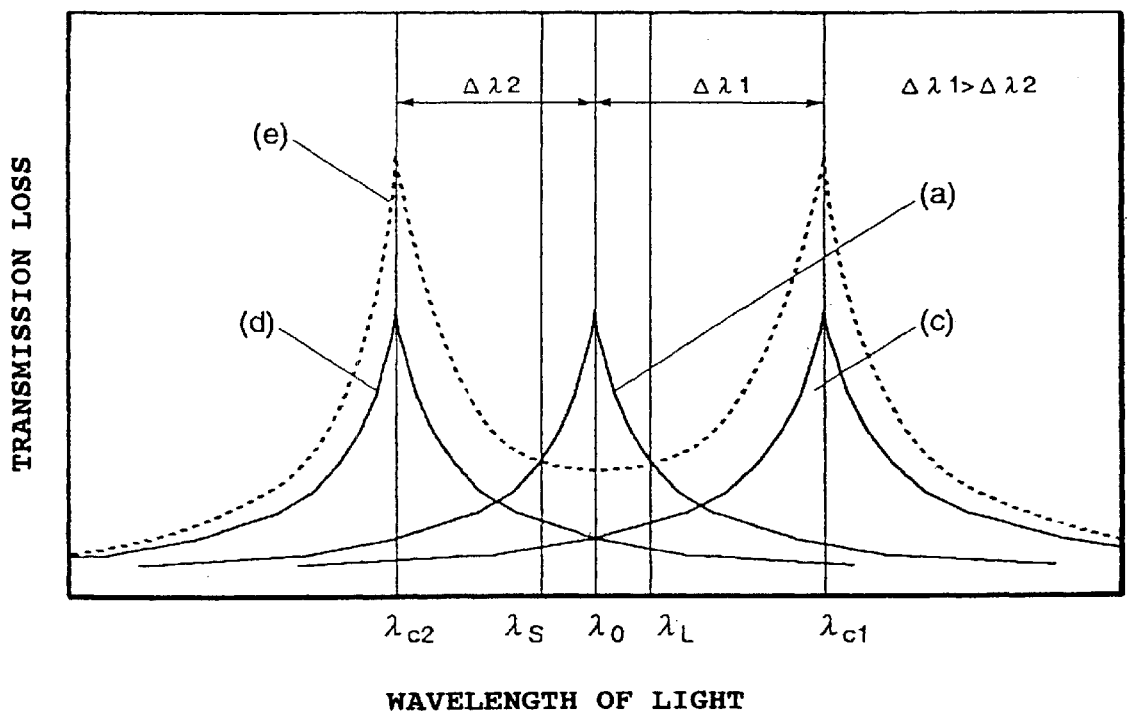
FIG. 9 is a diagram showing another example of the transmission loss spectrum of the first preferred embodiment.

Further, by setting the power to be injected into the first heater 103 slightly larger than the power to be withdrawn from the second heater 203, the wavelength flatness can be optimized. The reason for this fact will now be described with reference to FIG. 9. FIG. 9 shows the transmission loss spectra of the first Mach-Zehnder type interference unit 100, the second Mach-Zehnder type interference unit 200, and the cascaded first and second Mach-Zehnder type interference units 100 and 200 in the case that the power to be injected into the first heater 103 is set slightly larger than the power to be withdrawn from the second heater 203.

In FIG. 9, the line (a) shows the transmission loss spectrum of each of the first and second Mach-Zehnder type interference units 100 and 200 in the case that the power applied to the first heater 103 is 0 and the power applied to the second heater 203 is P0 (equal to the power for providing a phase difference π). The line (d) shows the transmission loss spectrum of the second Mach-Zehnder type interference unit 200 in the case that the power applied to the second heater 203 is decreased by P2 from P0, and the line (c) shows the transmission loss spectrum of the first Mach-Zehnder type interference unit 100 in the case that the power P1 is applied to the first heater 103.

The line (e) shows the transmission loss spectrum of the cascaded first and second Mach-Zehnder type interference units 100 and 200. In the case that P1=P2, the line (e) shown in FIG. 4 is provided, in which the attenuation at the longer wavelength $\lambda_L$ is larger than that at the shorter wavelength $\lambda_S$. To the contrary, by setting P1>P2 and adjusting the difference between P1 and P2 to a suitable value, the line (e) shown in FIG. 9 is obtained, in which the attenuation spectrum in the wavelength range of $\lambda_S$ to $\lambda_L$ is symmetrical with respect to $\lambda_0$. Therefore, the wavelength flatness in the case of P1>P2 can be improved as compared with the case of P1=P2. Also in this case that the power to be injected into the first heater 103 is set slightly larger than the power to be withdrawn from the second heater 203, a change in the sum of the powers to be supplied to the two heaters 103 and 203 is smaller than that in the conventional optical attenuator disclosed in U.S. Pat. No. 5,956,437, so that a change in heat value in the optical attenuator according to this preferred embodiment can be suppressed.

Figure 10:
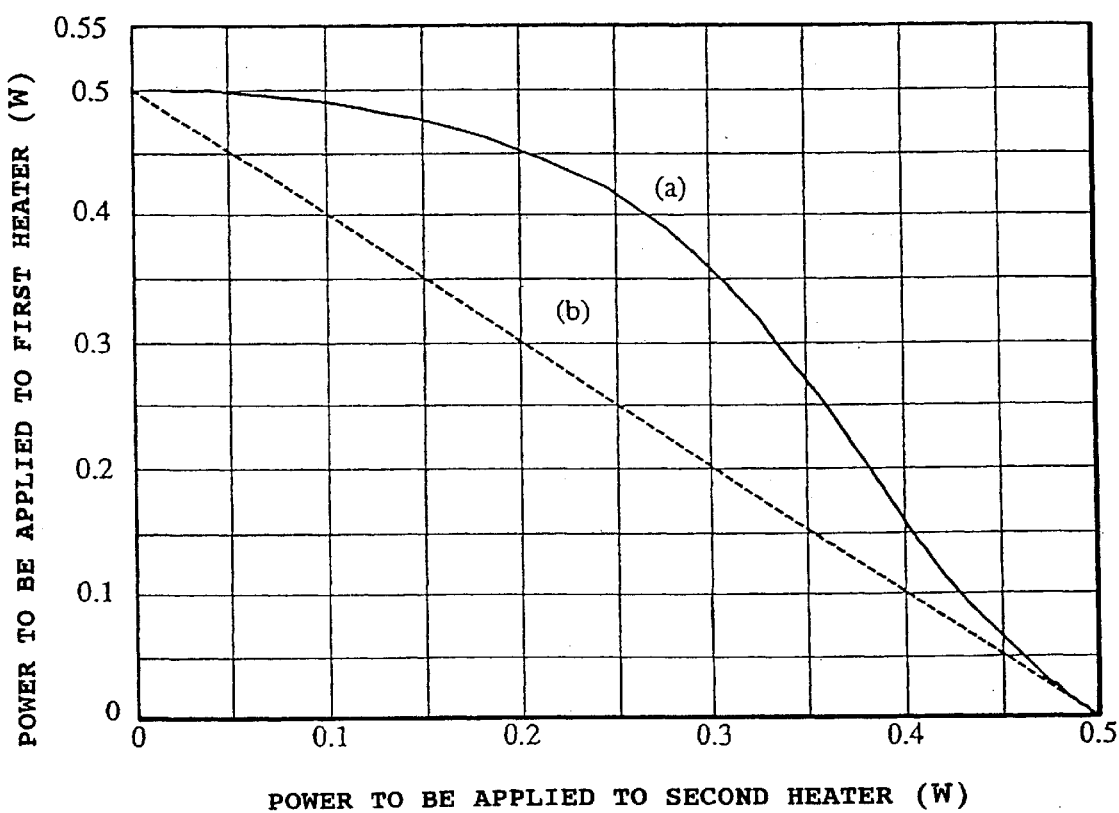
FIG. 10 is a graph showing still another example of the distribution of powers to be applied to the heaters.

FIG. 10 shows another example of power distribution such that power is distributed to the first heater 103 and the second heater 203. In FIG. 10, the line (a) shows the power distribution in the case that the power to be applied to the first heater 103 is set larger than the power to be withdrawn from the second heater 203, and the line (b) shows the power distribution in the case that the power to be applied to the first heater 103 is P1 and the power to be applied to the second heater 203 is P0–P1 (P0=0.5 W). In this case, the transmission loss spectrum shown in FIG. 6 is obtained. More specifically, the line (a) shows the power distribution selected to improve the wavelength flatness in the case that the length of the first interference optical waveguide arm 110 is set larger than the length of the second interference optical waveguide arm 120 by an amount equal to ½ of 1.56595 µm when the refractive index is 1.

Figure 11:
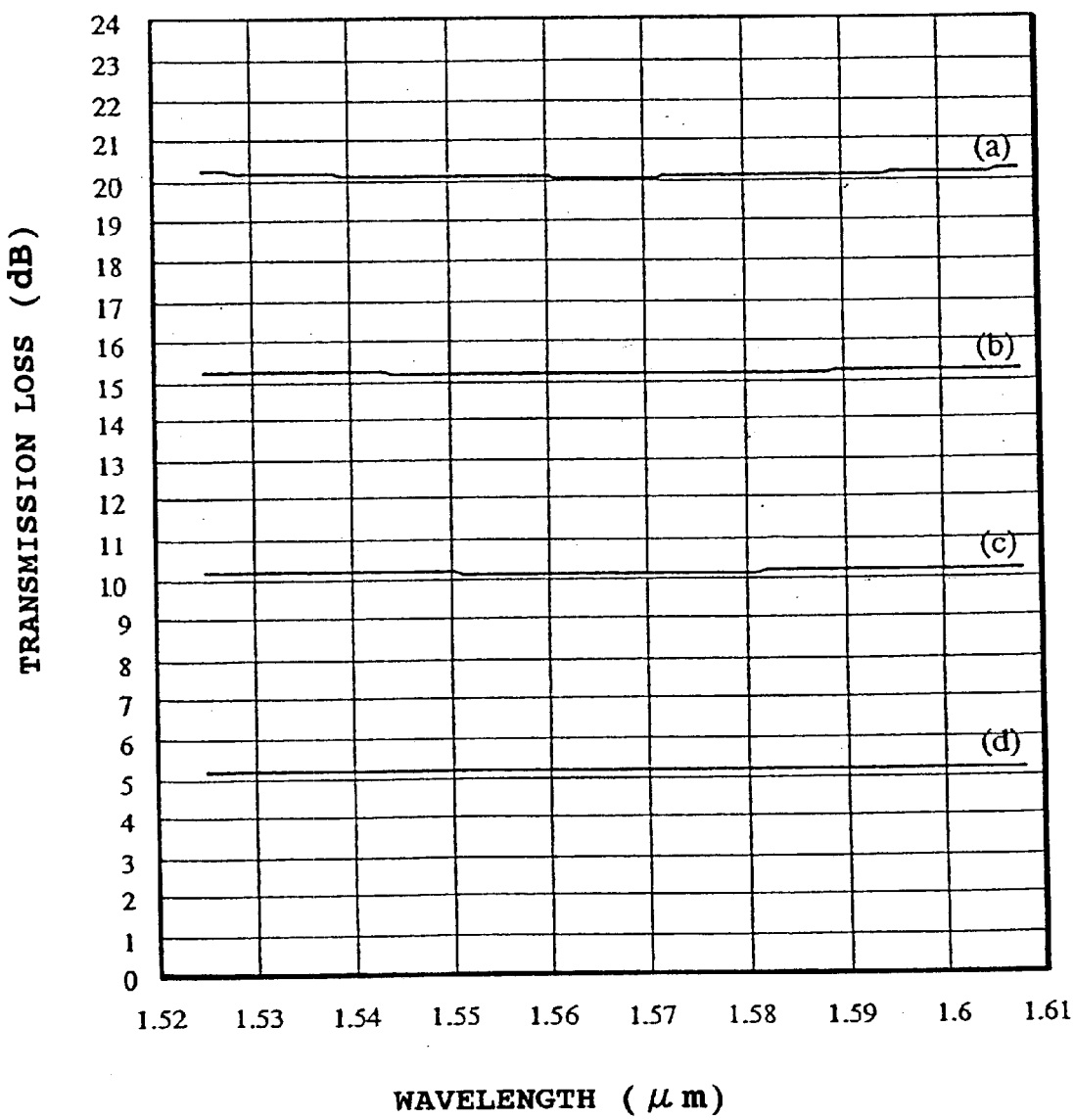
FIG. 11 is a graph showing the transmission loss in the case of changing the powers to be applied to the heaters so that the power distribution shown in FIG. 10 is provided.
Figure 12:
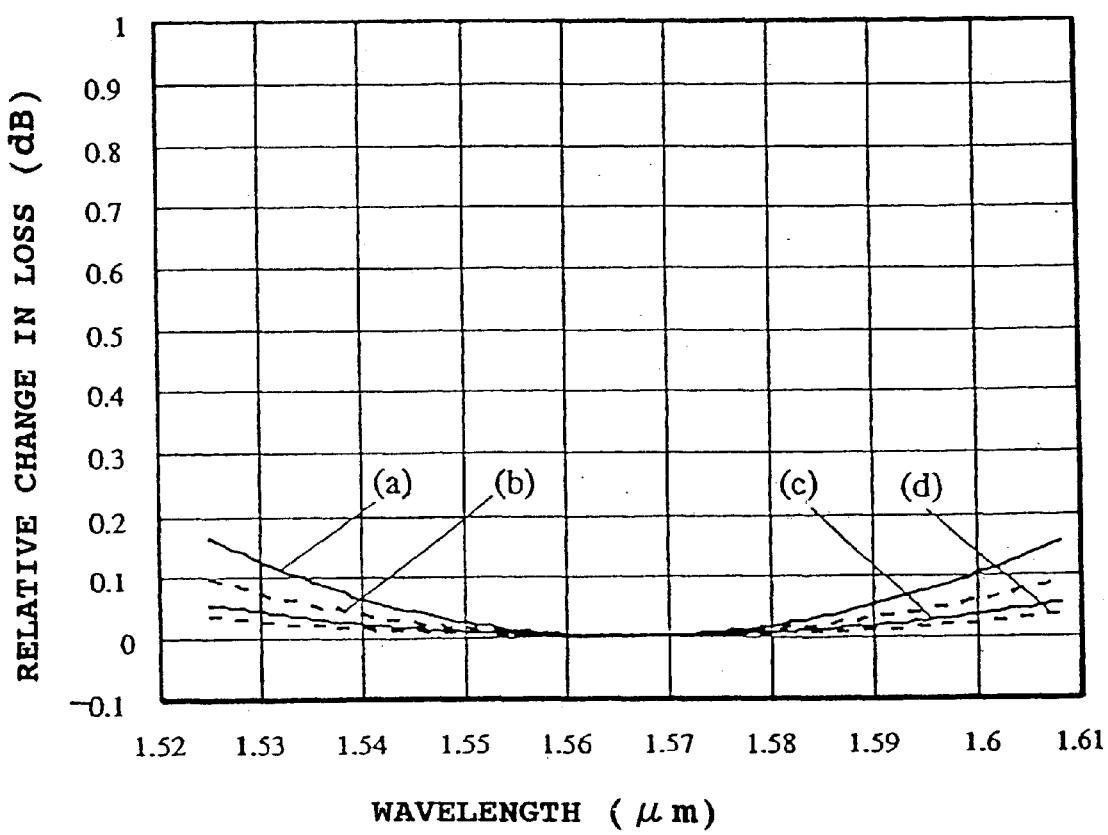
FIG. 12 is a graph showing a relative loss to the loss at a center wavelength (=1.565 μm) as an arithmetic mean in relation to FIG. 10.

FIG. 11 shows the transmission loss spectrum in the case that the powers to be applied to the first and second heaters 103 and 203 are changed so as to provide the power distribution shown in FIG. 10. The lines (a) to (d) shown in FIG. 11 respectively correspond to the conditions of the lines (a) to (d) shown in FIG. 6. FIG. 12 is a graph showing a relative loss to the loss at a center wavelength (=1.565 µm) as an arithmetic mean. It is understood that the relative loss shown in FIG. 12 is flattened as compared with that shown in FIG. 7.

As an example, assuming that $\lambda_S$=1.525 µm, $\lambda_L$=1.608 µm, and the center wavelength is set to a geometric mean (=1.56595 µm) of $\lambda_S$ and $\lambda_L$ in FIG. 9, Lx is set to 78.2975 µm so that the optical path difference between the first and second interference optical waveguide arms 110 and 120 of the first Mach-Zehnder type interference unit 100 becomes equal to ½ of the center wavelength (½×1.56595 µm=0.782975 µm). In this case, the powers to be applied to the first and second heaters 103 and 203 are obtained so that the sum of derivatives of the attenuations of the Mach-Zehnder type interference units 100 and 200 at the center wavelength becomes 0, thereby obtaining the relation shown by the line (a) in FIG. 10. It is to be noted that the derivatives of the attenuations means dL/dλ where L is an attenuation at near $\lambda_0$ and λ is wavelength.

Figure 13:
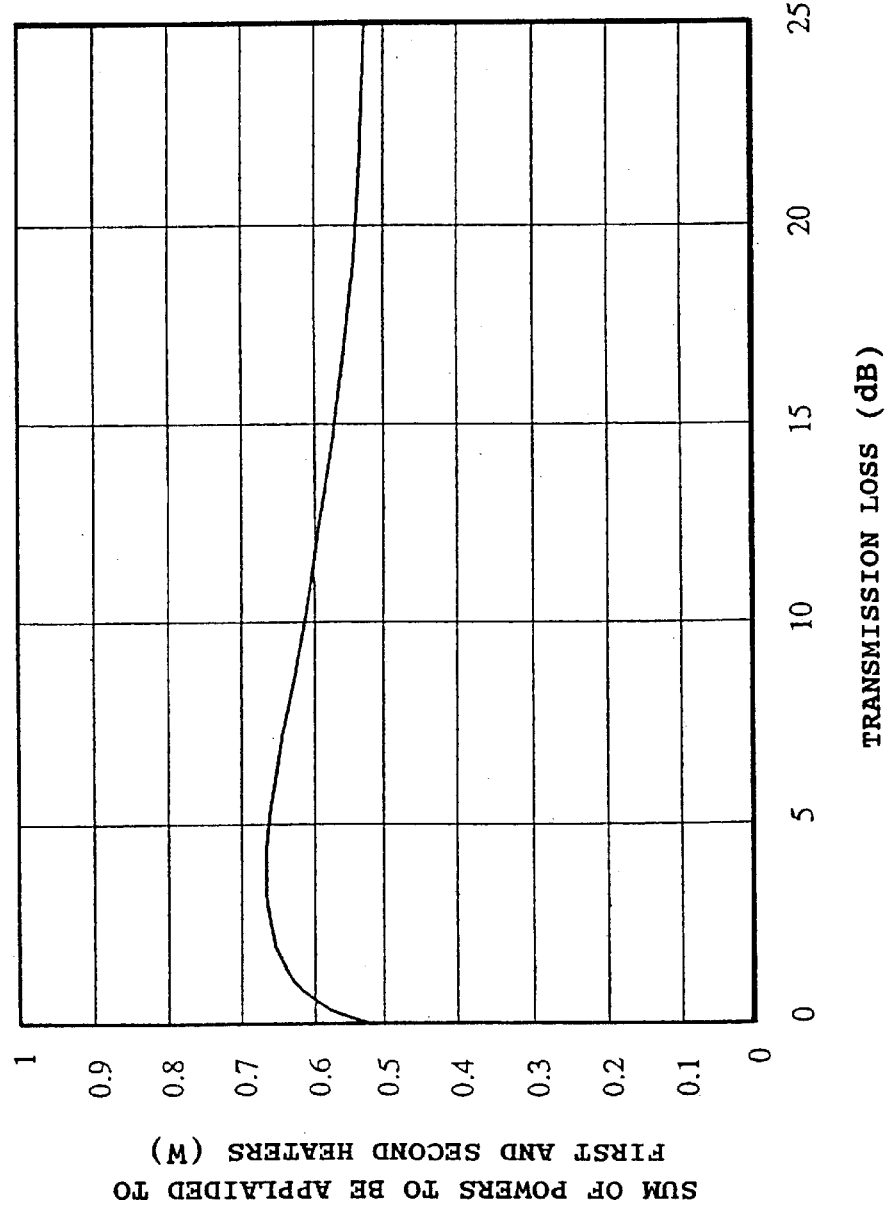
FIG. 13 is a graph showing the relation between transmission loss and total power consumption in the case shown in FIG. 10.

FIG. 13 is a graph showing the relation between transmission loss and total power consumption in the case shown in FIG. 10. As understood from FIG. 13, the total power consumption is slightly larger than that in the case shown by the line (a) in FIG. 10 (the total power consumption is constant at 0.5 W). However, the maximum power consumption can be reduced as compared with that in the prior art (the maximum power consumption is 1 W).

Figure 14:
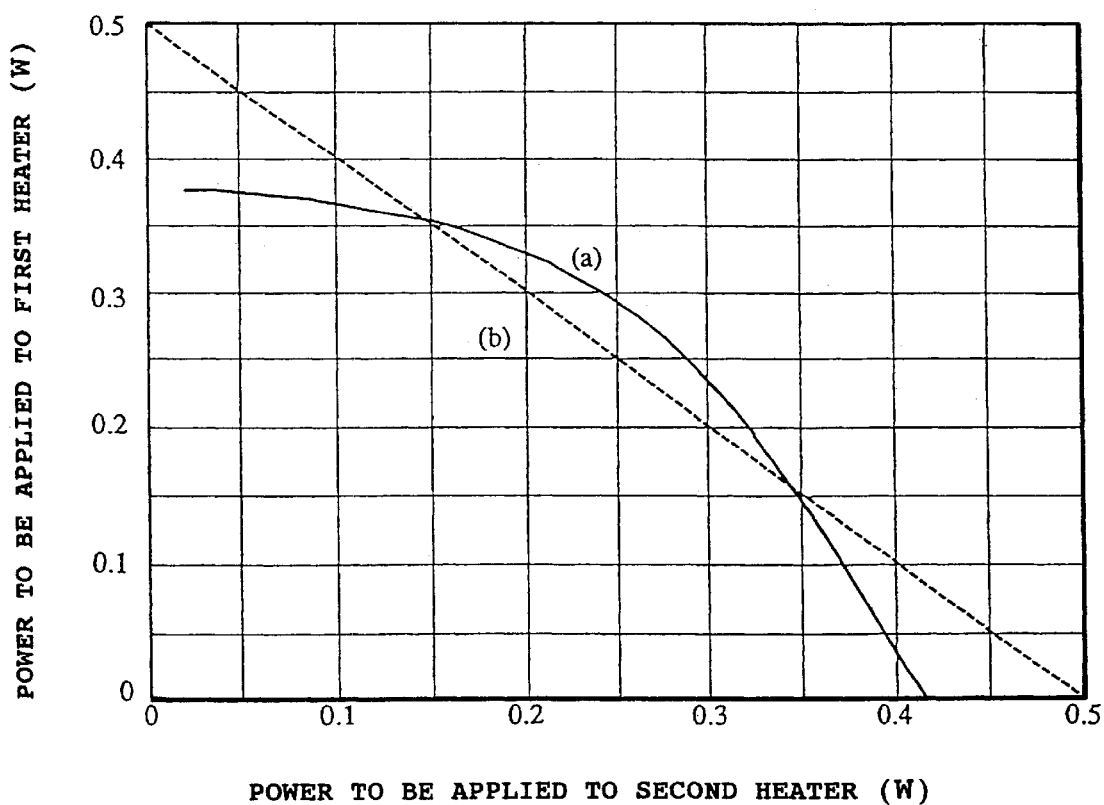
FIG. 14 is a graph showing still another example of the distribution of powers to be applied to the heaters.

FIG. 14 is a graph showing still another example of the power distribution to the first and second heaters.

In FIG. 14, the line (a) shows the power distribution selected to improve the wavelength flatness in the case that the length of the first interference optical waveguide arm 110 is set larger than the length of the second interference optical waveguide arm 120 by an amount equal to ½ of 1.9527 µm. In this case, the condition that the power to be applied to the first heater 103 is 0 corresponds to the condition that a power of 0.15 W is applied to the first heater 103 in the case of the line (a) shown in FIG. 10. Accordingly, the power consumption is reduced.

Figure 15:
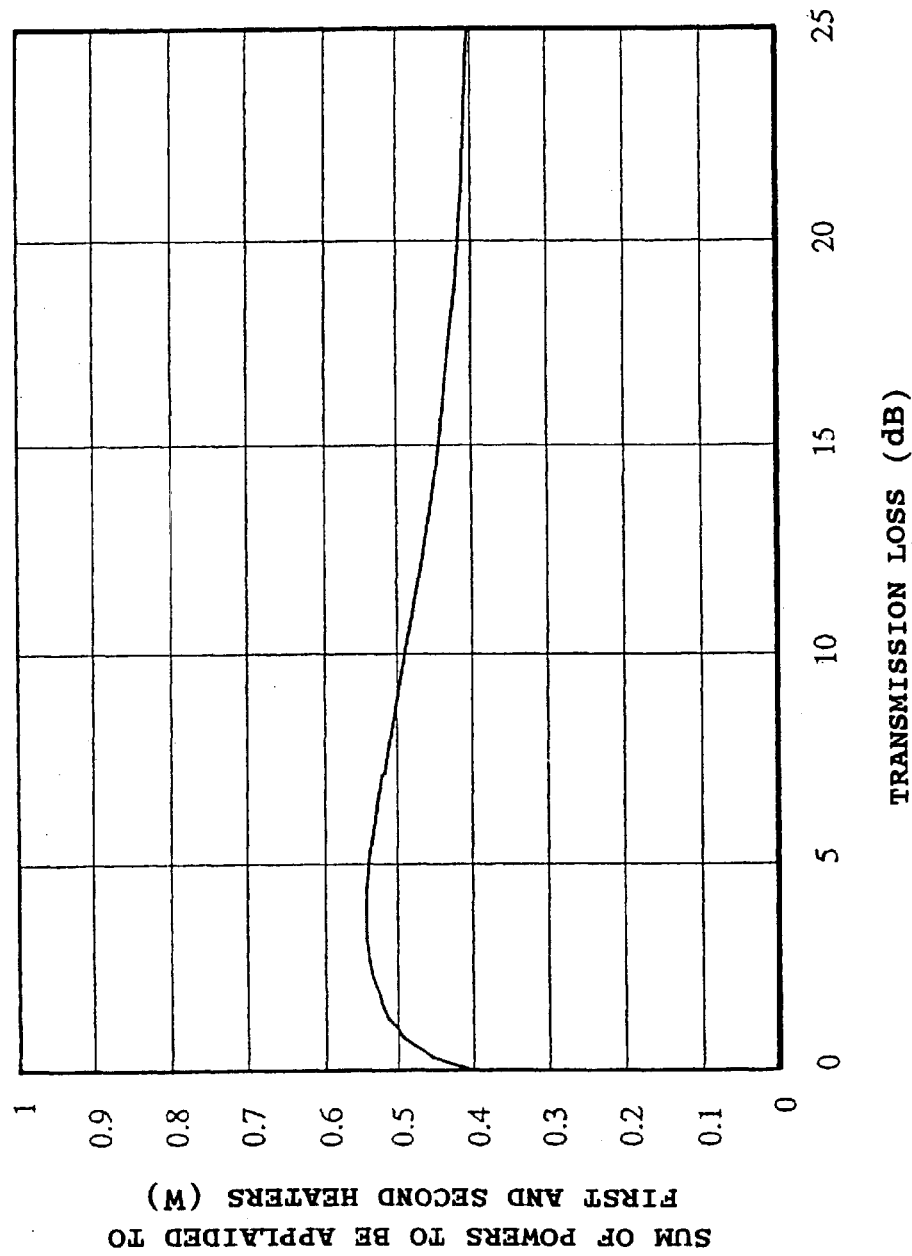
FIG. 15 is a graph showing the relation between transmission loss and total power consumption in the case shown in FIG. 14.

FIG. 15 is a graph showing the relation between transmission loss and total power consumption in the case shown in FIG. 14. As apparent from FIG. 15 in comparison with FIG. 13, the maximum power consumption is reduced by about 0.12 mW.

Further, by setting the length of the first interference optical waveguide arm 110 larger than the length of the second interference optical waveguide arm 120 by an amount corresponding to a phase of (2n+1+α)π for a given wavelength where n is an integer greater than or equal to 0 and α is a number greater than or equal to 0 and less than 1, a maximum power consumption required to change the attenuation from a desired value to a minimum value or to a maximum value can be reduced. This will now be described with reference to FIG. 16.

Figure 16:
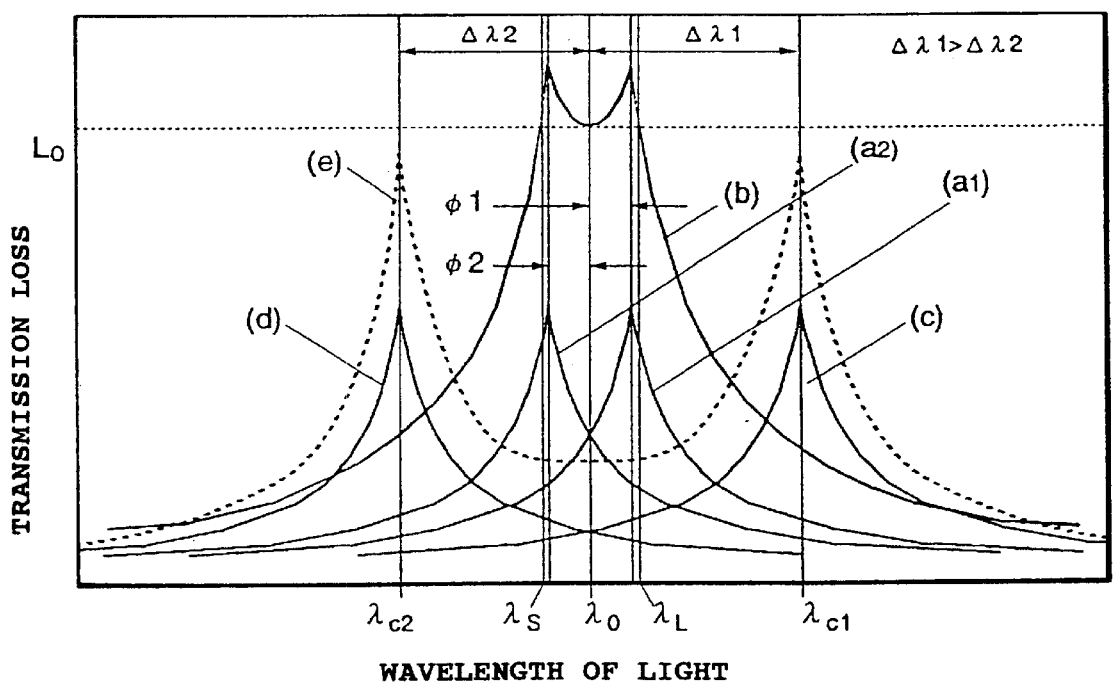
FIG. 16 is a diagram showing still another example of the transmission loss spectrum of the first preferred embodiment.

FIG. 16 shows still another example of the transmission loss spectrum according to the first preferred embodiment. In FIG. 16, the line (a1) shows the transmission loss spectrum of the first Mach-Zehnder type interference unit 100 when the power applied to the first heater 103 is 0, in which the first interference optical waveguide arm 110 is longer than the second interference optical waveguide arm 120 by an amount corresponding to a phase of (π+φ1) for a given wavelength. The line (a2) shows the transmission loss spectrum of the second Mach-Zehnder type interference unit 200 in which the third and fourth interference optical waveguide arms 210 and 220 have the same length when a given power is applied to the second heater 203 so that the third interference optical waveguide arm 210 becomes longer than the fourth interference optical waveguide arm 220 by an amount corresponding to a phase of (π−φ2) for a given wavelength.

The line (b) shows the transmission loss spectrum of the cascaded first and second Mach-Zehnder type interference units 100 and 200 under the above conditions.

In the above description, each of φ1 and φ2 denotes a phase difference greater than 0 and less than π. The phase may change cyclically by 2π, so that (π+φ1) may be generally expressed by (2n+1+α)π. In this example, a transmission loss greater than or equal to L0 can be obtained in the wavelength range of $\lambda_S$ to $\lambda_L$ as shown in FIG. 16.

By applying the power P1 to the first heater 103 and withdrawing the power P2 from the second heater 203, the lines (a1) and (a2) are moved in parallel to the lines (c) and (d), respectively. As a result, the attenuation characteristic shown by the line (e) can be obtained. When the phase difference between the interference optical waveguide arms of each of the Mach-Zehnder type interference units 100 and 200 is 0 or 2nπ (n is a positive integer), the transmission loss becomes minimum, and the power to be first applied to the second heater 203 can be reduced because of the initial offset φ2. As a result, the power consumption can be reduced. In the case of φ1>φ2 in FIG. 16, the flatness of the loss spectrum shown by the line (b) is improved. Further, since the power to be applied to the second heater 203 is decreased simultaneously with the application of the power to the first heater 103, total power fluctuations can be suppressed.

While the first Mach-Zehnder type interference unit 100 is arranged on the left side and the second Mach-Zehnder type interference unit 200 is arranged on the right side as viewed in FIG. 1, the arrangement is merely illustrative. That is, the interference unit 100 may be arranged on the right side and the interference unit 200 may be arranged on the left side as viewed in FIG. 1. Further, light may be incident on any of the right end and the left end of the optical device according to the present invention, and the same characteristic is exhibited regardless of the direction of incidence of light. Further, while the second heater 203 is formed on the third interference optical waveguide arm 210 in the preferred embodiment shown in FIG. 1, the second heater 203 may be formed on the fourth interference optical waveguide arm 220.

The optical device (optical attenuator) with optical waveguides according to the first preferred embodiment shown in FIG. 1 is effective especially in the case of using it as an equalizer for equalizing the powers of a plurality of light sources in WDM communication. That is, the optical attenuator shown in FIG. 1 is arranged downstream of each light source, and the powers of the plural light sources are equalized by setting the attenuation to the light source having the lowest optical power to 0 and attenuating the powers of the other light sources. In such a case of using the optical attenuator as an equalizer, the optical attenuator is used in a wavelength region where the loss is relatively low.

In the first preferred embodiment shown in FIG. 1, by setting the length of the first interference optical waveguide arm 110 larger by 1.56595 μm (corresponding to phase delay of 2π) than the length of the second interference optical waveguide arm 120, it is possible to realize an optical device with optical waveguides in which the transmission loss to light having a wavelength of 1.56595 μm is minimized when the powers to be applied to the first and second heaters 103 and 203 are 0. The above-mentioned length difference 1.56595 μm is an optical path difference converted in the vacuum. Accordingly, in the case of using the optical device (optical attenuator) according to this preferred embodiment as an equalizer for equalizing the powers of a plurality of light sources in WDM communication, the optical device operates in a wavelength region providing a substantially minimum power consumption, thus effecting a reduction in power consumption.

Figure 17:
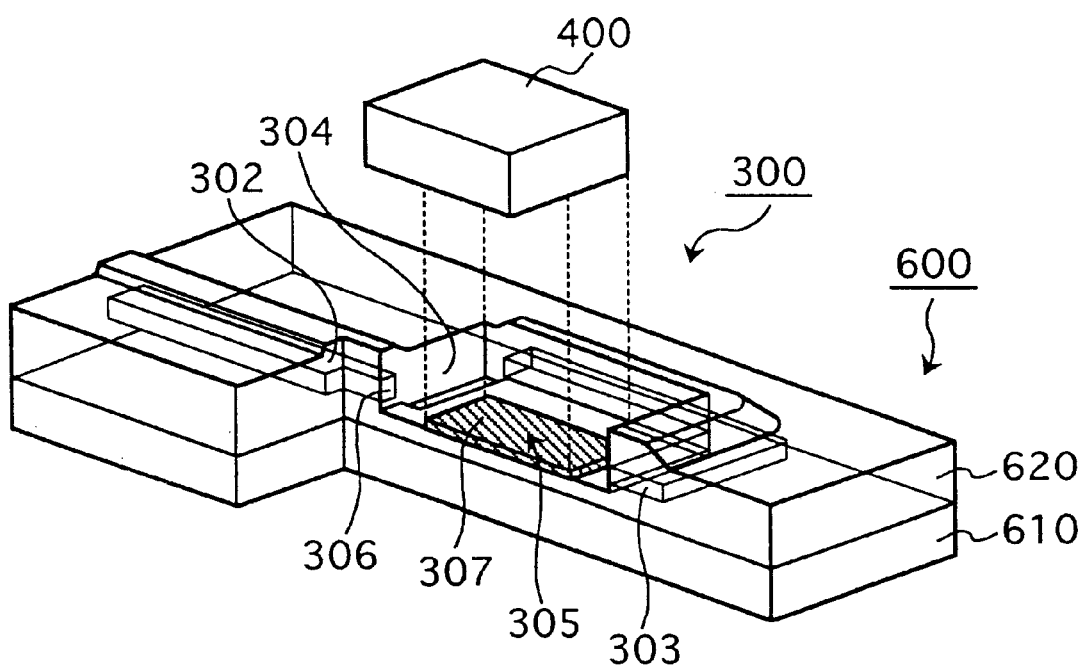
FIG. 17 is an exploded perspective view showing the mounting of an optical component.

Referring to FIG. 17, there is shown an exploded perspective view of the optical component mounting portion 300. The optical component mounting surface 305 is formed by reactive ion etching in the waveguide layer 600 formed on the silicon substrate 610 in such a manner that the mounting surface 305 is lower by 10 μm in level than the center of the core. The photodiode 400 as an optical component is mounted on the mounting surface 305.

Figure 18A:
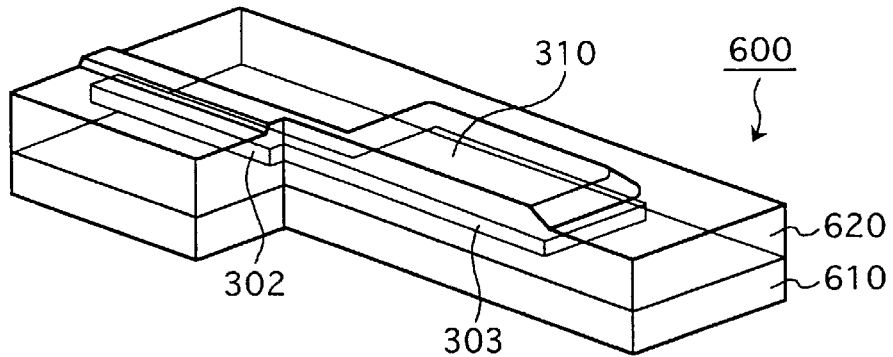
FIGS. 18A to 18C are perspective views showing a manufacturing method for an optical component mounting portion according to the present invention.

A manufacturing method for the optical component mounting portion 300 will now be described with reference to FIGS. 18A to 18C. As shown in FIG. 18A, an under-cladding layer having a thickness of 20 μm is formed on the silicon substrate 610 by CVD and a core layer having a thickness of 7 μm is next formed on the under-cladding layer by CVD. Then, a mask pattern for etching is formed by a photolithography process, and a core pattern 302 and a core base 303 are formed through the mask pattern by reactive ion etching. Then, an over-cladding layer having a thickness of 20 μm is formed so as to cover the core pattern 302 and the core base 303. Accordingly, the cladding 620 is formed on the silicon substrate 610 in such a manner that a raised portion 310 is formed over the core pattern 302 and the core base 303.

Figure 18B:
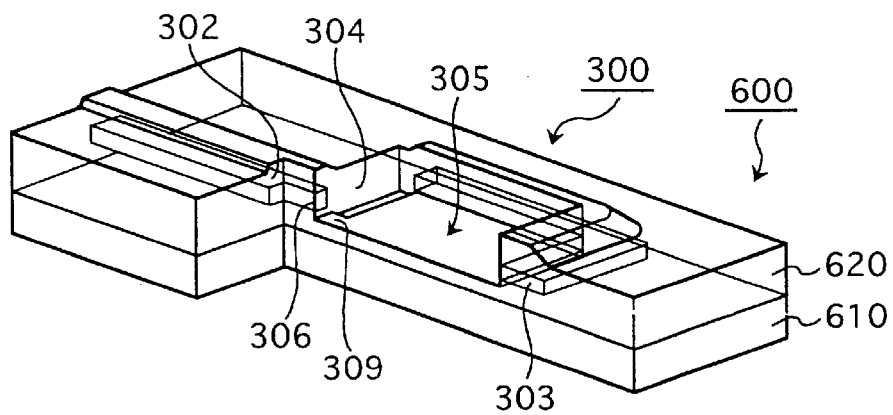

As shown in FIG. 18B, a mask pattern for etching is formed by a photolithography process and a groove 304 is formed through this mask pattern by reactive ion etching. The depth of the groove 304 is adjusted by controlling an etching time so that the level difference between the core center and the optical component mounting surface 305 becomes 10 μm. Accordingly, the flat mounting surface 305 and a surface (core mark) 309 having the same level as that of the mounting surface 305 due to the presence of the core base 303 are formed as shown in FIG. 18B.

Figure 18C:
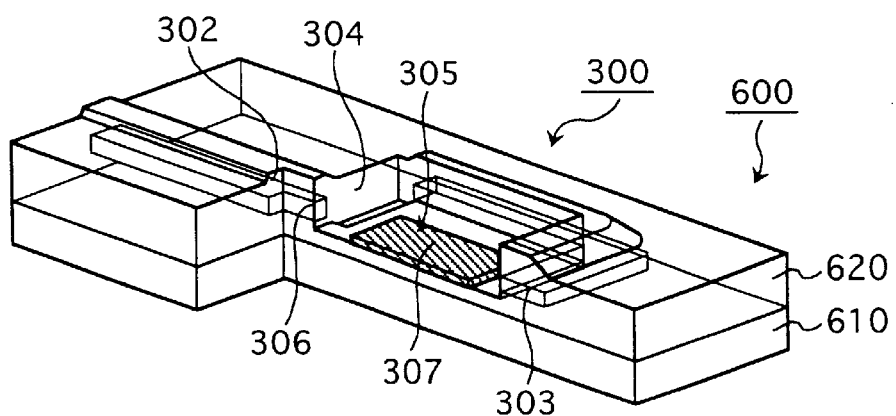

Thereafter, a bonding pad 307 is formed on the mounting surface 305 as shown in FIG. 18C, and the photodiode 400 is bonded to the upper surface of the bonding pad 307 as shown in FIG. 17. In bonding the photodiode 400, the core mark 309 can be used as a reference mark for horizontal positioning of the photodiode 400.

Figure 19A:
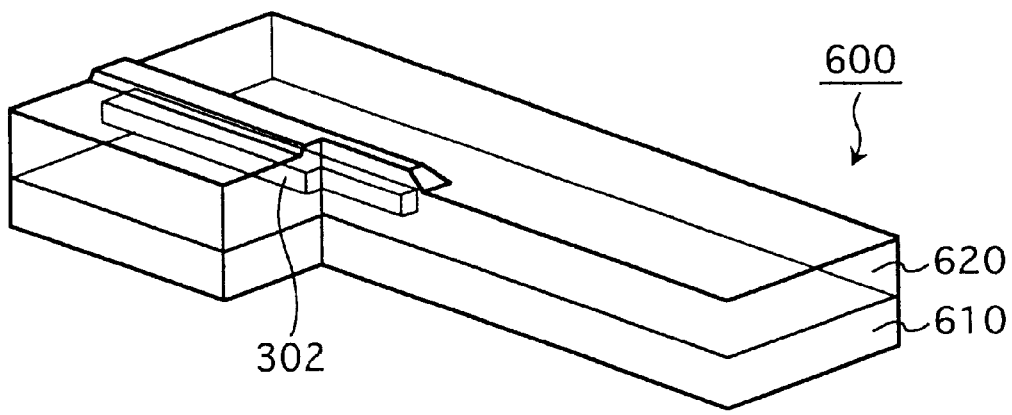
FIGS. 19A and 19B are perspective views showing a manufacturing method for an optical component mounting portion as a comparison.
Figure 19B:
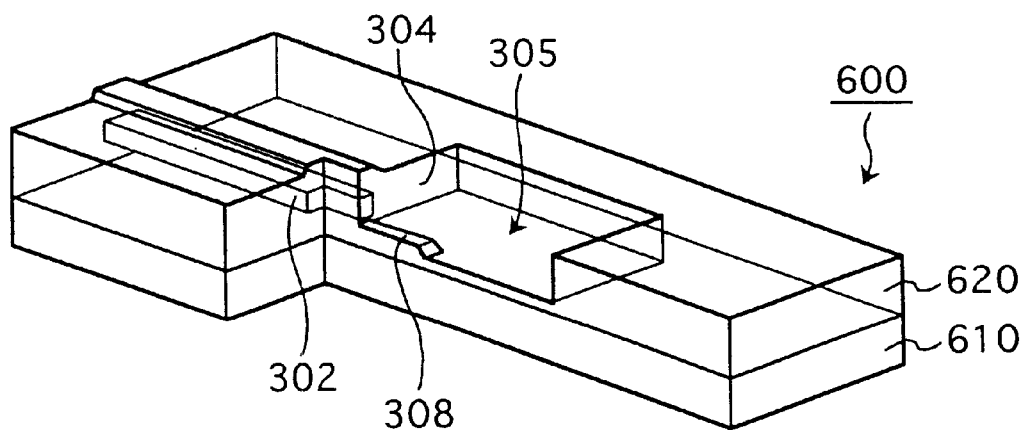

A manufacturing method for an optical component mounting portion having no core base will now be described as a comparison with reference to FIGS. 19A and 19B. In the case that the core base 303 as shown in FIG. 18A is not formed, the upper surface of the optical waveguide layer 600 before forming the optical component mounting surface 305 is raised only at a portion corresponding to the core pattern 302 as shown in FIG. 19A. After etching the optical waveguide layer 600 including such a raised portion, the level difference on the original surface is transferred to the etched surface, so that a projection 308 is formed on the optical component mounting surface 305 as shown in FIG. 19B. This projection 308 may hinder the bonding of the optical component.

To the contrary, according to the manufacturing method for the optical component mounting portion according to the present invention as shown in FIGS. 18A to 18C, the optical waveguide layer is etched after forming the core base 303 to obtain the flat mounting surface 305. As a result, the bonding pad 307 can be easily formed and the photodiode 400 can be easily mounted on the bonding pad 307.

Figure 20A:
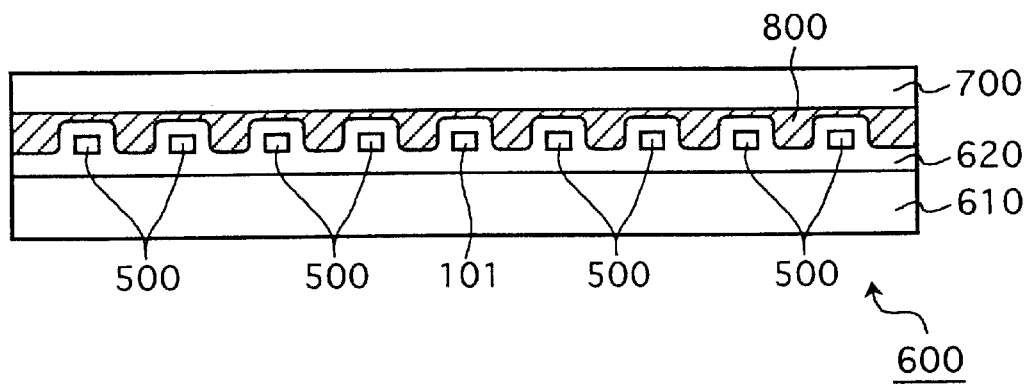
FIGS. 20A to 20C are sectional views showing configurations of an end portion of the first preferred embodiment.
Figure 20B:
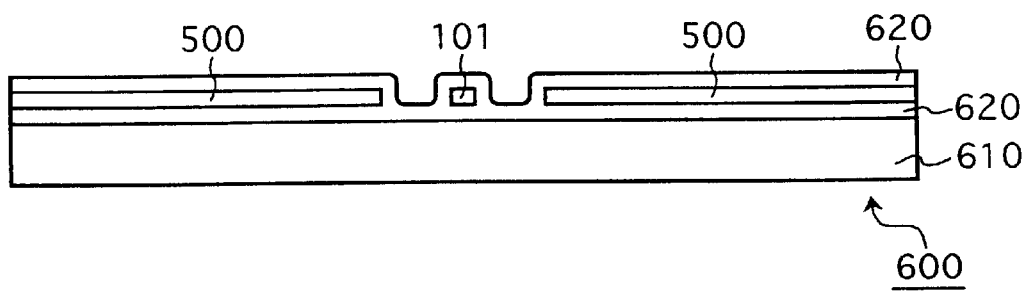
Figure 20C:
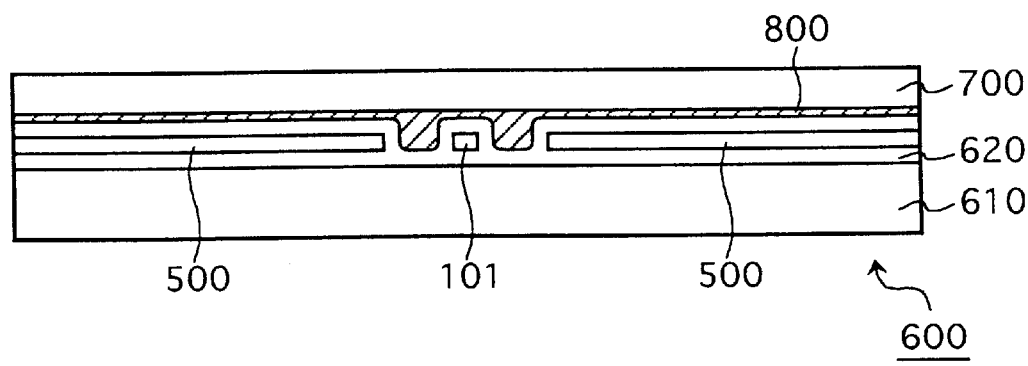

As shown in FIG. 2, the plural height adjusting layers 500 in the form of stripes are formed near opposite ends of the optical waveguide 600 where optical input and output ports are formed. Each height adjusting layer 500 is formed at the same level as that of the input waveguide (core) 101. These height adjusting layers 500 function as a spacer for adjusting the thickness of an adhesive layer 800 (see FIG. 20A) in mounting another member (e.g., member 700 shown in FIG. 20A) on the waveguide 600, thereby uniforming the thickness of the adhesive layer 800 to improve a bonding strength. In the case of making the thickness of the adhesive layer 800 smaller than the depth of each groove on the upper surface of the waveguide 600, the width of each height adjusting layer 500 is enlarged as shown in FIG. 20B. In this case, the thickness of the adhesive layer 800 can be reduced over the surface except a portion on the opposite sides of the core 101 as shown in FIG. 20C.

Figure 21:
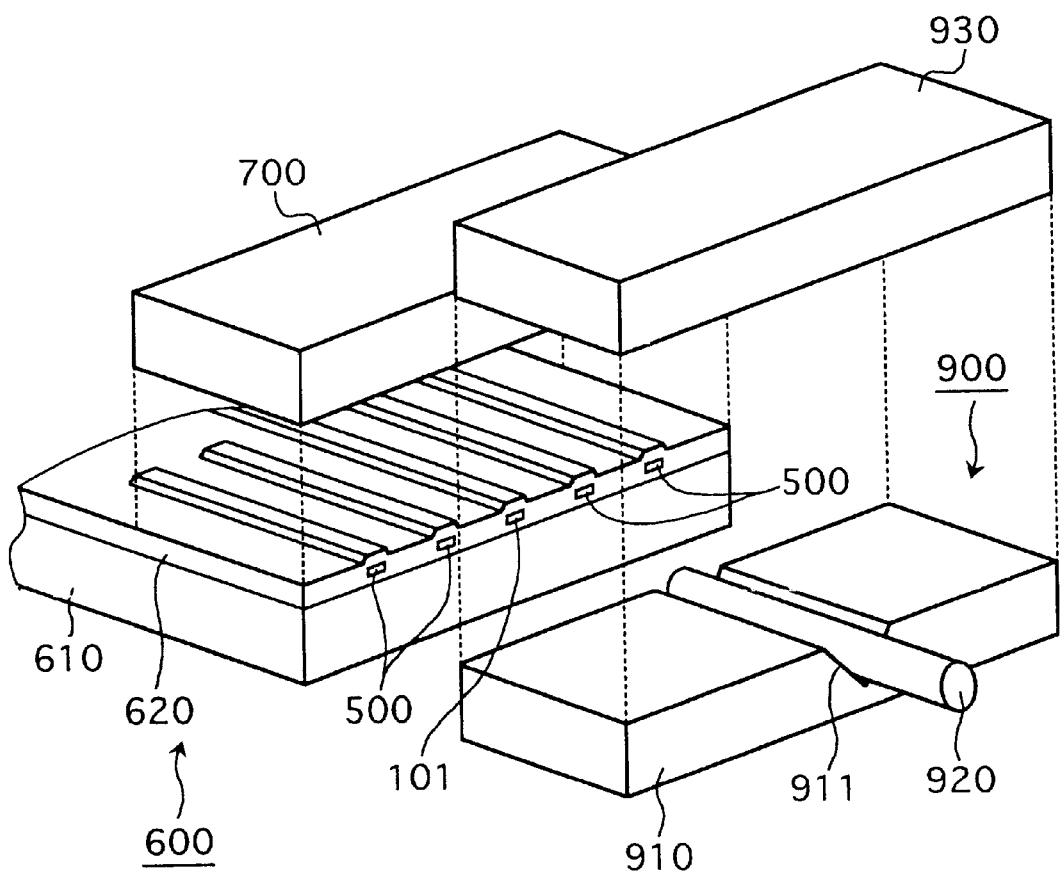
FIG. 21 is an exploded perspective view of an optical fiber connecting portion.
Figure 22:
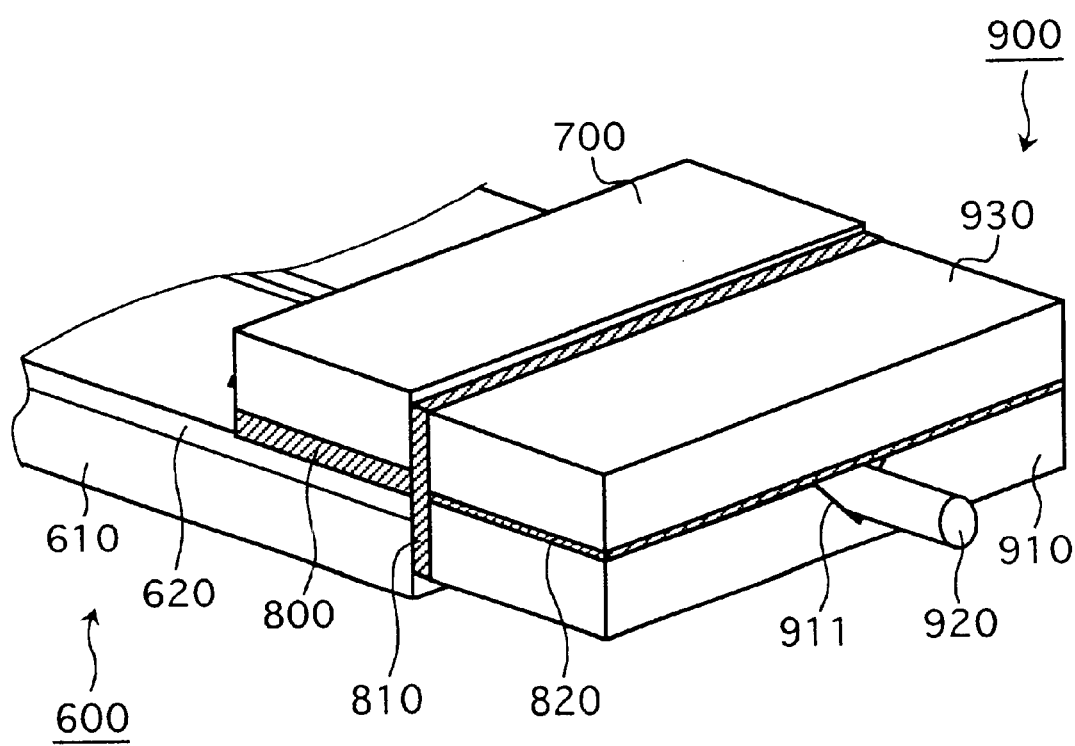
FIG. 22 is a perspective view of the optical fiber connecting portion.

FIGS. 21 and 22 show an example of connection of an optical fiber to the left end or right end of the optical device shown in FIG. 1. Reference numeral 600 denotes the optical waveguide including the silicon substrate 610, the cladding 620, the core 101, and the height adjusting layers 500 formed at the same level as that of the core 101. Reference numeral 700 denotes a member to be mounted on an end portion of the waveguide 600. Reference numeral 900 denotes an optical fiber block composed of a substrate 910 having a V-groove 911, an optical fiber 920 fixed in the V-groove 911, and a holder plate 930 for holding the optical fiber 920.

The holder plate 930 is attached to the substrate 910 to hold the optical fiber 920. As shown in FIG. 22, the member 700 is bonded to the waveguide 600 by the adhesive layer 800, and the holder plate 930 is bonded to the substrate 910 by an adhesive layer 820. The optical fiber block 900 is bonded to the assembly of the waveguide 600 and the member 700 by an adhesive layer 810 after making the alignment of the optical fiber 920 and the core 101. By using the height adjusting layers 500 in connecting the optical fiber 920 by the above method, the thickness of the adhesive layer 800 can be made uniform as shown in FIG. 20A to thereby improve the bonding strength and the reliability. In the case of reducing the thickness of the adhesive layer 800, the width of each height adjusting layer 500 may be increased as shown in FIG. 20C.

Figure 23:
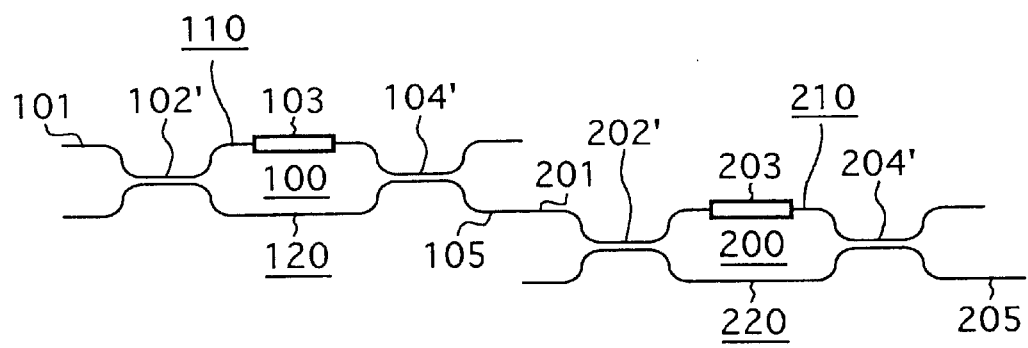
FIG. 23 is a schematic diagram showing a modification of the first preferred embodiment.
Figure 24:
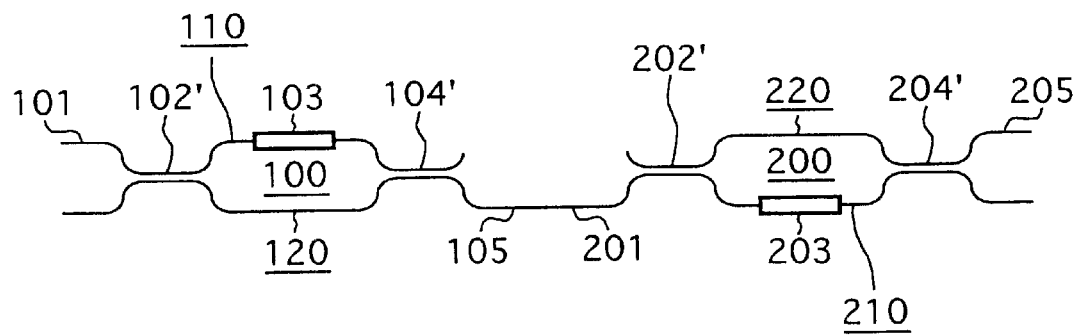
FIG. 24 is a schematic diagram showing another modification of the first preferred embodiment.

While each of the 3-dB optical couplers 102, 104, 202, and 204 shown in FIG. 1 according to the first preferred embodiment is configured by a Y coupler, the configuration of each 3-dB optical coupler in the present invention is not limited to that shown in FIG. 1. For example, as shown in FIGS. 23 and 24, directional couplers 102', 104', 202', and 204' each having a gap may be used as the 3-dB optical couplers in the present invention. Further, the 3-dB optical couplers in the present invention may be provided by directional couplers with no gaps (MMI optical couplers) as described in Journal of Lightwave Technology, VOL. 13, NO. 14, pp. 615–627 (1995), for example.

Referring to FIG. 25, there is shown a plan view of an optical device with optical waveguides according to a second preferred embodiment of the present invention. In the second preferred embodiment, substantially the same parts as those in the first preferred embodiment are denoted by the same reference numerals, and the description thereof will be omitted herein to avoid the repetition. Reference numeral 100' denotes a first Mach-Zehnder type optical interference unit having first and second interference optical waveguide arms 110 and 120. The length of the first interference optical waveguide arm 110 is set longer than the length of the second interference optical waveguide arm 120 so that the phase difference of light having a given wavelength passing through the first and second interference optical waveguide arms 110 and 120 becomes $2n\pi$ where n is an integer greater than or equal to 0. In general, the phase difference becomes $2\pi$.

A first heater 103 is mounted on the shorter interference optical waveguide arm 120. The heater 103 is connected through wiring patterns 107 to a drive circuit 130. Reference numeral 200' denotes a second Mach-Zehnder type optical interference unit having substantially the same structure as that of the second Mach-Zehnder type optical interference unit 200 shown in FIG. 1. That is, the interference unit 200' has third and fourth interference optical waveguide arms 210 and 220 having the same length in general. More generally, the lengths of the third and fourth interference optical waveguide arms 210 and 220 are adjusted so that the phase difference of light having a given wavelength passing through the optical waveguide arms 210 and 220 becomes $2n\pi$ where n is an integer greater than or equal to 0.

A second heater 203 is mounted on the fourth interference optical waveguide arm 220. Alternatively, the second heater 203 may be mounted on the third interference optical waveguide arm 210. The heater 203 is connected through wiring patterns 207 to a drive circuit 230. The drive circuits 130 and 230 are controlled by a controller 140 such as MPU.

The optical device with optical waveguides according to the second preferred embodiment is operated in the following manner. It is assumed that the length of the first interference optical waveguide arm 110 is larger than the length of the second interference optical waveguide arm 120 by an amount corresponding to a phase of $2\pi$ for light having a given wavelength and that the length of the third interference optical waveguide arm 210 is equal to the length of the fourth interference optical waveguide arm 220 for the light having the given wavelength. When no power is applied to the heaters 103 and 203, the losses of the first Mach-Zehnder type optical interference unit 100' and the second Mach-Zehnder type optical interference unit 200' are substantially zero, i.e., minimum. When the power to be applied to the heater 103 is increased, the loss of the first Mach-Zehnder type optical interference unit 100' is increased, and becomes maximum when the phase difference is $\pi$.

Figure 26A:
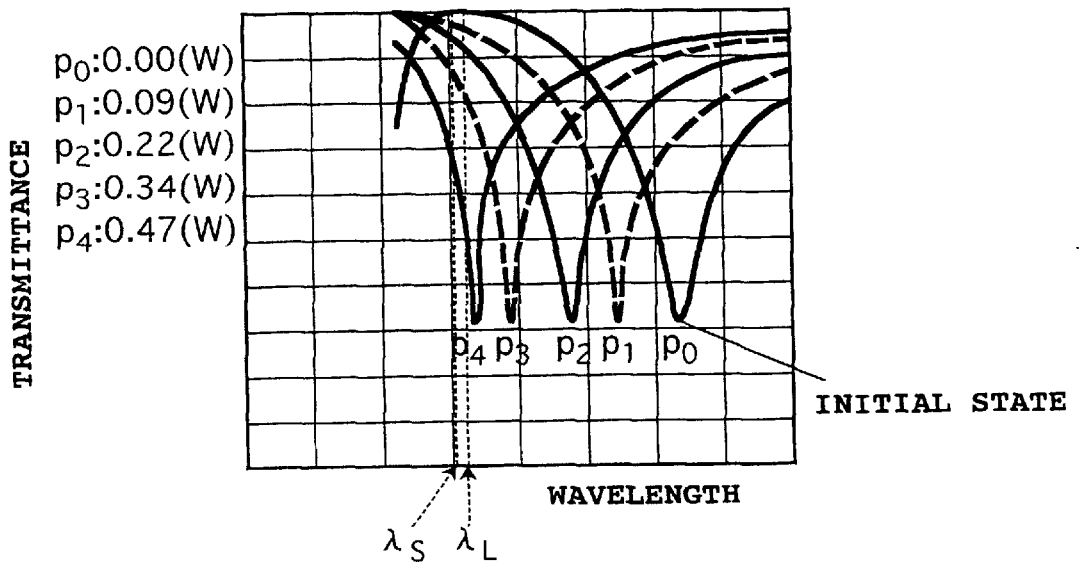
FIG. 26A is a graph showing a change in transmittance in the case that power is applied to the heater in a first Mach-Zehnder type optical interference unit.
Figure 26B:
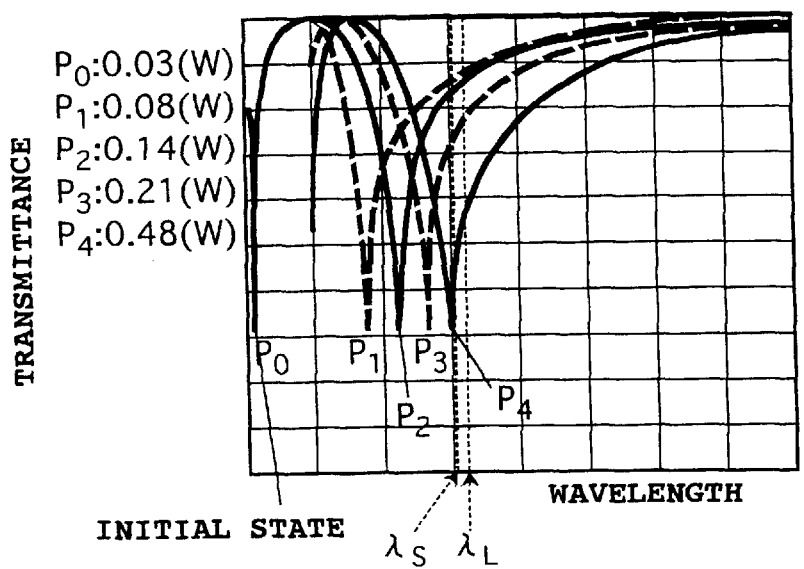
FIG. 26B is a graph showing a change in transmittance in the case that power is applied to the heater in a second Mach-Zehnder type optical interference unit.

FIG. 26A shows a change in transmittance of the first Mach-Zehnder type optical interference unit 100' when power is applied to the heater 103. In FIG. 26A, $\lambda_S=1.525$ $\mu$m, $\lambda_L=1.608$ $\mu$m, and the wavelength region between $\lambda_S$ and $\lambda_L$ is used for WDM communication. As apparent from FIG. 26A, the loss of the interference unit 100' in the wavelength region for use in WDM communication increases with an increase in power applied to the heater 103. On the other hand, when the power to be applied to the heater 203 in the second Mach-Zehnder type optical interference unit 200' is increased, the phases of light passing through the third and fourth interference optical waveguide arms 210 and 220 are gradually deviated from each other, so that the loss of the interference unit 200' increases, and becomes maximum when the phase difference is $\pi$. FIG. 26B shows such a change in transmittance of the second Mach-Zehnder type optical interference unit 200' when power is applied to the heater 203. As apparent from FIG. 26B, the loss of the interference unit 200' in the wavelength region for use in WDM communication increases with an increase in power applied to the heater 203.

Figure 27:
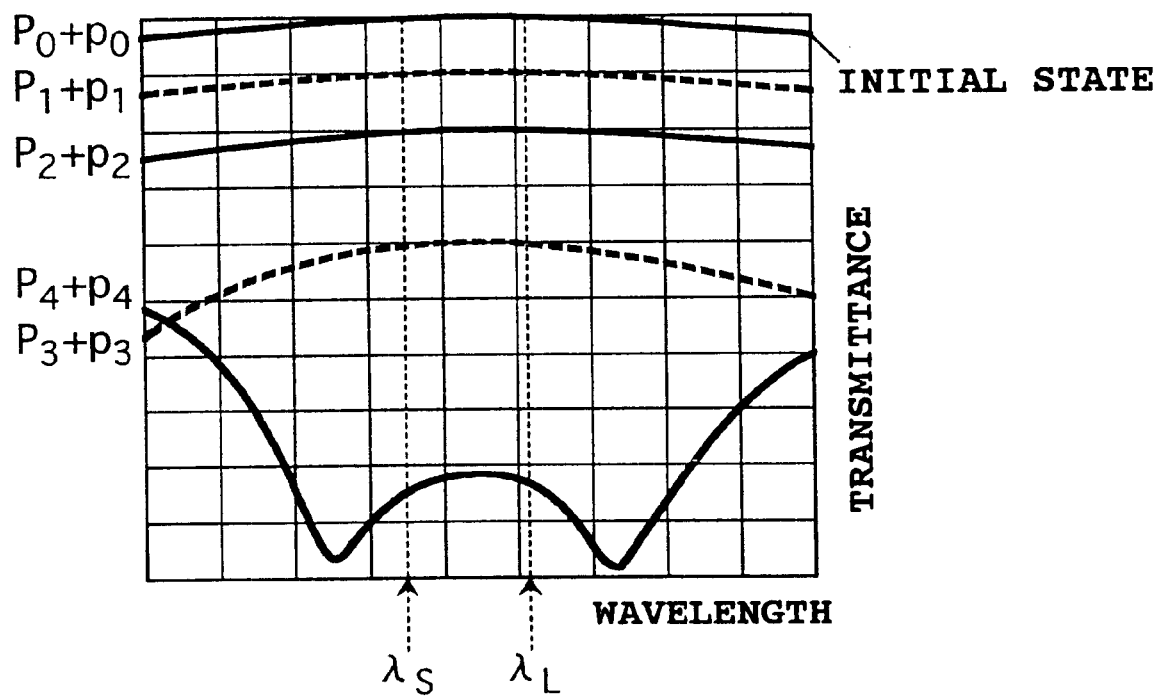
FIG. 27 is a graph showing a change in transmittance of the cascaded first and second Mach-Zehnder type optical interference units.

FIG. 27 shows a change in transmittance of the cascaded first and second Mach-Zehnder type optical interference units 100' and 200'. By cascading the first and second Mach-Zehnder type optical interference units 100' and 200', the transmittances of the two interference units 100' and 200' are added together to thereby obtain an optical attenuator superior in wavelength flatness. In general, an equalizer for WDM communication is used in a wavelength region where the loss is relatively low. Accordingly, in the case of using the optical attenuator according to this preferred embodiment as an equalizer for WDM communication, the optical attenuator is operated in a wavelength region where the power consumption becomes substantially minimum, thereby effecting a reduction in power consumption.

According to the present invention as described above, it is possible to provide a variable optical attenuator which is superior in wavelength flatness and can effect a reduction in power consumption. Furthermore, temperature control can be easily performed because of a small change in heat value.

In the case of using the optical attenuator according to the present invention as an equalizer for WDM communication, the reduction in power consumption can be accelerated with an increase in number of WDM channels as compared with the prior art.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:

a first Mach-Zehnder type optical interference unit including a first input optical waveguide, a first input 3-dB optical coupler optically connected in tandem with said first input optical waveguide, first and second interference optical waveguide arms optically connected in tandem with said first input 3-dB optical coupler opposite to said first input optical waveguide, said second optical waveguide arm having a length shorter than that of said first optical waveguide arm, a first output 3-dB optical coupler optically connected in tandem with said first and second interference optical waveguide arms, and a first single output optical waveguide optically connected in tandem with said first output 3-dB optical coupler opposite to said first and second interference optical waveguide arms;

a second Mach-Zehnder type optical interference unit including a second single input optical waveguide connected to said first single output optical waveguide, a second input 3-dB optical coupler optically connected in tandem with said second single input optical waveguide, third and fourth interference optical waveguide arms optically connected in tandem with said second input 3-dB optical coupler opposite to said second single input optical waveguide, a second output 3-dB optical coupler optically connected in tandem with said third and fourth interference optical waveguide arms, and a second output optical waveguide optically connected in tandem with said second output 3-dB optical coupler opposite to said third and fourth interference optical waveguide arms;

first phase control means provided on said first interference optical waveguide arm; and second phase control means provided on any one of said third and fourth interference optical waveguide arms;

the lengths of said third and fourth interference optical waveguide arms being adjusted so that the phase difference of light having a given wavelength passing through said third and fourth interference optical waveguide arms becomes $2n\pi$ where n is an integer greater than or equal to 0;

said first and second Mach-Zehnder type optical interference units being optically connected in tandem with each other.

2. An optical device according to claim 1, wherein the lengths of said first and second interference optical waveguide arms are adjusted so that the phase difference of light having a given wavelength passing through said first and second interference optical waveguide arms becomes $(2n+1+\alpha)\pi$ where n is an integer greater than or equal to 0 and $\alpha$ is a number greater than or equal to 0 and less than 1.

3. An optical device according to claim 2, wherein said first phase control means comprises a first heating element, and said second phase control means comprises a second heating element.

4. An optical device according to claim 3, further comprising:

first drive means for driving said first heating element;

second drive means for driving said second heating element; and control means for controlling said first drive means and said second drive means so that predetermined initial electric energy is preliminarily applied to said second heating element by driving said second drive means, and when increasing electric energy to be applied to said first heating element, electric energy to be applied to said second heating element is simultaneously decreased, whereas when decreasing the electric energy to be applied to said first heating element, the electric energy to be applied to said second heating element is simultaneously increased.

5. An optical device according to claim 4, wherein said control means controls said first drive means and said second drive means so that an increase in the electric energy to be applied to said first heating element becomes equal to a decrease in the electric energy to be applied to said second heating element when decreasing the electric energy from said second heating element simultaneously with increasing the electric energy to said first heating element.

6. An optical device according to claim 4, wherein said control means controls said first drive means and said second drive means so that an increase in the electric energy to be applied to said first heating element becomes larger than a decrease in the electric energy to be applied to said second heating element when decreasing the electric energy from said second heating element simultaneously with increasing the electric energy to said first heating element.

7. An optical device according to claim 6, wherein said control means controls the electric energies to be applied to said first and second heating elements so that the sum of a derivative of attenuation with respect to wavelength near $\lambda_0$ in said first Mach-Zehnder type optical interference unit and a derivative of attenuation with respect to wavelength near $\lambda_0$ in said second Mach-Zehnder type optical interference unit becomes 0 where $\lambda_0$ is a center wavelength defined as the square of the product of a shortest wavelength $\lambda_1$ and a longest wavelength $\lambda_2$ in a wavelength range subjected to attenuation control.

8. An optical device according to claim 1, further comprising:

a substrate on which said first and second Mach-Zehnder type optical interference units are formed; and a photodiode formed on said substrate for detecting light branched from any one of said first and second input optical waveguides and said first and second output optical waveguides.

9. An optical device comprising:

a first Mach-Zehnder type optical interference unit including a first input optical waveguide, a first input 3-dB optical coupler optically connected in tandem with said first input optical waveguide, first and second interference optical waveguide arms optically connected in tandem with said first input 3-dB optical coupler opposite to said first input optical waveguide, said second optical waveguide arm having a length shorter than that of said first optical waveguide arm, a first output 3-dB optical coupler optically connected in tandem with said first and second interference optical waveguide arms, and a first single output waveguide optically connected in tandem with said first output 3-dB optical coupler opposite to said first and second interference optical waveguide arms;

a second Mach-Zehnder type optical interference unit including a second single input optical waveguide connected to said first single output optical waveguide, a second input 3-dB optical coupler optically connected in tandem with said second single input optical waveguide, third and fourth interference optical waveguide arms optically connected in tandem with said second input 3-dB optical coupler opposite to said second single input optical waveguide, a second output 3-dB optical coupler optically connected in tandem with said third and fourth interference optical waveguide arms, and a second output optical waveguide optically connected in tandem with said second output 3-dB optical coupler opposite to said third and fourth interference optical waveguide arms;

first phase control means provided on said second interference optical waveguide arm; and second phase control means provided on any one of said third and fourth interference optical waveguide arms;

the lengths of said first and second interference optical waveguide arms being adjusted so that the phase difference of light having a given wavelength passing through said first and second interference optical waveguide arms becomes $2m\pi$ where m is an integer greater than 0;

the lengths of said third and fourth interference optical waveguide arms being adjusted so that the phase difference of light having a given wavelength passing through said third and fourth interference optical waveguide arms becomes $2n\pi$ where n is an integer greater than or equal to 0;

said first and second Mach-Zehnder type optical interference units being optically connected in tandem with each other.

10. An optical device according to claim 9, wherein said first phase control means comprises a first heating element, and said second phase control means comprises a second heating element.

11. An optical device according to claim 10, further comprising:

first drive means for driving said first heating element;

second drive means for driving said second heating element; and control means for controlling said first drive means and said second drive means.

* * * * *